United States Patent
Kashima et al.

(10) Patent No.: US 9,296,143 B2
(45) Date of Patent: Mar. 29, 2016

(54) PROCESS OF MANUFACTURING A CURVED MEMBER HAVING A HIGH-GRADE DESIGN SURFACE AND MEMBER MANUFACTURED BY THE PROCESS

(75) Inventors: Keiichi Kashima, Chiyoda-ku (JP); Takehiro Suga, Chiyoda-ku (JP); Junichi Miura, Chiyoda-ku (JP); Ryo Niimi, Chiyoda-ku (JP); Toshiaki Hotaka, Chiyoda-ku (JP)

(73) Assignee: TEIJIN CHEMICALS, LTD., Tokyo (JP)

( * ) Notice: Subject to any disclaimer, the term of this patent is extended or adjusted under 35 U.S.C. 154(b) by 675 days.

(21) Appl. No.: 13/502,861

(22) PCT Filed: Oct. 15, 2010

(86) PCT No.: PCT/JP2010/068646
§ 371 (c)(1),
(2), (4) Date: Apr. 19, 2012

(87) PCT Pub. No.: WO2011/049186
PCT Pub. Date: Apr. 28, 2011

(65) Prior Publication Data
US 2012/0225241 A1 Sep. 6, 2012

(30) Foreign Application Priority Data

Oct. 20, 2009 (JP) ................................ 2009-241466

(51) Int. Cl.
*B29C 51/08* (2006.01)
*B29C 45/56* (2006.01)
(Continued)

(52) U.S. Cl.
CPC ........... *B29C 45/561* (2013.01); *B29C 45/0055* (2013.01); *B29C 53/04* (2013.01); *B29C 51/02* (2013.01); *B29C 51/08* (2013.01); *B29C 53/84* (2013.01); *B29K 2069/00* (2013.01)

(58) Field of Classification Search
None
See application file for complete search history.

(56) References Cited

U.S. PATENT DOCUMENTS 4,385,951 A * 5/1983 Pressau .......................... 156/105
5,676,896 A * 10/1997 Izumida et al. ................ 264/132
(Continued)

FOREIGN PATENT DOCUMENTS

JP 05-69478 3/1993
JP 6-77961 10/1994
(Continued)

OTHER PUBLICATIONS

Iwasaki, Kunio; JP 2002-128909 A Machine Translation; May 2002.*

(Continued)

*Primary Examiner* — Ryan Ochylski
(74) *Attorney, Agent, or Firm* — Wenderoth, Lind & Ponack, L.L.P.

(57) ABSTRACT

It is an object of the present invention to provide a process capable of manufacturing various types of curved members having a high-grade design surface which are used as glazing members for means of transport such as automobiles at a low cost.

The present invention is the process of manufacturing a curved member having a high-grade design surface, comprises the steps of:
(1) preparing a sheet having a high-grade design surface by injection compression molding a resin material containing a thermoplastic resin;
(2) preheating the sheet at a temperature of (Tg+5)° C. to (Tg+70)° C. (Tg(° C.) is the glass transition temperature of the resin material) to soften it; and
(3) applying pressure to the softened sheet to curve the high-grade design surface.

14 Claims, 7 Drawing Sheets

(51) Int. Cl.
*B29C 45/00* (2006.01)
*B29C 53/04* (2006.01)
B29C 51/02 (2006.01)
B29C 53/84 (2006.01)
B29K 69/00 (2006.01)

(56) References Cited

U.S. PATENT DOCUMENTS

2005/0196567 A1    9/2005  Iwasaki et al.
2009/0039556 A1*   2/2009  Sawada et al. ............ 264/319

FOREIGN PATENT DOCUMENTS

| JP | 10-119085 | 5/1998 |
| JP | 10278062 A * | 10/1998 |
| JP | 10282316 A * | 10/1998 |
| JP | 2002-128909 | 5/2002 |
| JP | 2005-081757 | 3/2005 |
| JP | 2005-161652 | 6/2005 |
| JP | 2005-280757 | 10/2005 |
| JP | 2005-344006 | 12/2005 |
| JP | 2009-220554 | 10/2009 |

OTHER PUBLICATIONS

Ekinaka et al.; JP 2005-161652 A Machine Translation; Jun. 2005.*
International Preliminary Report on Patentability issued May 24, 2012 in corresponding International Application No. PCT/JP2010/068646.
Y. Harazaki, "Basic Science of Coating", (with partial English translation), p. 51, 1977.
B.R. Burchardt et al., "Adhesives and Sealants: General Knowledge, Application, Techniques, New Curing Techniques" Elastic Bonding and Sealing in Industry, Fig. 27, p. 385, 2006.

* cited by examiner

PROCESS OF MANUFACTURING A CURVED MEMBER HAVING A HIGH-GRADE DESIGN SURFACE AND MEMBER MANUFACTURED BY THE PROCESS

TECHNICAL FIELD

The present invention relates to a process of manufacturing a curved member having a high-grade design surface and a member manufactured by the process. More specifically, the present invention relates to a process capable of manufacturing a member having a high-grade design surface which is required for the glazing member of means of transport such as automobiles efficiently at a low cost.

BACKGROUND ART

Heretofore, attempts have been actively made to substitute glass glazing by transparent thermoplastic resin glazing so as to reduce the weight, improve the safety and achieve the utilization which is impossible with glass of the glazing. In the field of means of transport typified by automobiles, attempts to substitute glass glazing by polycarbonate resin glazing having high impact resistance in particular are actively under way. In the field of means of transport, it is an essential and urgent issue to reduce the weight of the glazing. Therefore, attempts to substitute glass are further accelerated. Although a large number of proposals are made, this substitution does not proceed well in the field of automobiles. One of the main reasons that this substitution does not proceed in spite of a strong demand for lightweight glazing is the high cost of resin glazing.

As means of absorbing the cost, there have been proposed a method in which the steps for obtaining resin glazing are simplified by making use of the excellent moldability of a resin and a method in which a design unable to be achieved with glass glazing is adopted. For example, a curved molded article is obtained by the injection molding of a resin without a thermoforming step (refer to Patent Document 1). There is further proposed a method of manufacturing a frame material to be attached to a car body and integrated with a resin window by means of a single molding machine, making use of a multi-color molding method (refer to Patent Document 2). However, to obtain resin glazing having little perspective distortion by the injection molding method, a large-sized mold having excellent surface accuracy must be used (refer to Patent Document 3). The production of this mold is costly, which is one of the causes of the high cost of the resin glazing. Especially an irregular curved surface cannot avoid finish by hand polishing which is apt to cause the fine surface undulation of the mold. As a result, the manufacture of a large-sized mold having an irregular curved surface and excellent surface accuracy requires a considerably high technique and a lot of time with the result that the mold becomes very expensive. That is, in the case of glazing for automobiles which differs in shape according to type, the amount of initial investment in the manufacture of the mold is huge, thereby further boosting the cost of the resin glazing.

Meanwhile, what is particularly notable in the injection molding method is that glazing having a high-grade surface which is superior to glass glazing can be manufactured when a mold having excellent surface accuracy is used and molding is carried out under suitable conditions. It is assumed that this is because the resin surface is pressed against the surface of the mold at a high pressure in the injection molding method, thereby transferring a shape having high accuracy precisely. It can be said that this is an advantage which is not obtained by glass glazing which is manufactured in an open system and thermally curved. If the surface is not curved, it can be finished at a significantly high surface accuracy only by NC machining, and this machining can achieve accuracy to such an extent that substantially no fine surface undulation is produced. That is, it is possible to provide a molded article having a considerably high surface accuracy at an extremely low cost if it is shaped like a plain sheet.

There is known a method for obtaining curved resin glazing by thermoforming an extruded sheet having a low production cost, and the applicant of the present application has proposed the curved resin glazing as a preferred member for construction machines (refer to Patent Document 4). Even in the field of automobiles, this method is one of well-known methods of manufacturing show cars and race cars. However, it cannot be said that this method is satisfactory for the formation of a high-grade design surface required for the glazing of a stock car.

Stated more specifically, even when a gray sheet whose defect is not seen is used in the thermoforming of an extruded sheet, a poor appearance such as a gear mark becomes obvious after thermoforming. It is assumed that the reason for this is that a polymer chain is heated at a temperature higher than the glass transition temperature to release its frozen strain, thereby releasing forced homogeneity to promote the heterogeneity of the remaining orientation strain. The gear mark of the extruded sheet is mainly caused by the nonuniform rotation of a cooling roll at the time of manufacture, and when the extruded sheet is especially inferior, it is also due to the pulse movement of a gear pump and the vibration of the whole apparatus. Currently, it is difficult to greatly reduce the nonuniform rotation of the giant cooling roll.

Since a nonuniform pattern is observed in a thermoformed extruded sheet according to an observation method or a light source even when a gray sheet which has a specified amount of perspective strain is used, the thermoformed extruded sheet may not be accepted in the field of automobiles which include a strong factor as articles of taste. The nonuniform pattern is a pattern in a state that a perspective image or a reflected image is seen like a flare when it is observed from a direction at an acute angle from the surface or under a relatively strong light source.

As described above, a thermoformed article having a high-grade design surface is hardly obtained by the molding of an extruded sheet, and a problem that high cost cannot be avoided by injection molding capable of forming a high-grade design surface is not solved yet. These problems are also described in Patent Document 5, for example.
(Patent Document 1) JP-A 2005-344006
(Patent Document 2) JP-A 2009-220554
(Patent Document 3) JP-A 2002-128909
(Patent Document 4) JP-A 2005-161652
(Patent Document 5) JP-A 10-119085

DISCLOSURE OF THE INVENTION

As described above, a high-grade surface and a design surface are required for the glazing member of means of transport, especially automobiles, and it is an object to manufacture a wide variety of the members at a low cost. For the same technical object, the above Patent Document 5 proposes a method in which a sheet is fixed to a frame having high stiffness such as a metal frame without being thermoformed, and a portion around the sheet is injection molded from a thermoplastic resin such as vinyl chloride resin to be integrated with the frame. This method is limited to a case when the thickness of the sheet is small and cannot be used to produce a 3-D curved surface. The above Patent Document 2 discloses that a molded article obtained by injection compression molding is thermally curved and its peripheral portion is removed but concrete studies are not made.

The inventors of the present invention conducted intensive studies to solve the above problems and found that a curved molded article having a high-grade design surface is obtained by thermoforming a sheet formed by injection compression molding in place of a conventional extruded sheet. That is, they found that the thermal bending of a sheet becomes possible by applying suitable heat treatment conditions to a high-grade surface formed by injection compression molding even when the temperature exceeds the glass transition temperature of the resin material and that the obtained sheet has a high-grade surface. When it is taken into consideration that a latent defect becomes obvious in the thermoforming of an extruded sheet, the above result cannot be easily anticipated. Based on this knowledge, the inventors of the present invention conducted further studies and accomplished the present invention.

Since a regular sheet is used as a gray sheet in the manufacturing process of the present invention, it is not necessary to manufacture and possess a large number of high-accuracy molds, thereby making it possible to cut costs. Further, the manufacturing process and sheet of the present invention can meet high requirements in the field of automobiles. Since the cost of production equipment for thermoforming is lower than that for injection molding, the manufacturing process of the present invention is excellent in multi-type small-quantity production. The present invention provides a process of manufacturing a curved member and the curved member which have the above industrial advantages and are suitable especially for the manufacture of a glazing member for automobiles.

According to the present invention, the above objects are attained by the following constitutions.

1. A process of manufacturing a curved member having a high-grade design surface, comprising the steps of:
   (1) preparing a sheet having a high-grade design surface by injection compression molding a resin material containing a thermoplastic resin (step (1));
   (2) preheating the sheet at a temperature of (Tg+5)° C. to (Tg+70)° C. (Tg(° C.) is the glass transition temperature of the resin material) to soften it (step (2)); and
   (3) applying pressure to the softened sheet to curve the high-grade design surface (step (3)).
2. The manufacturing process in the above paragraph 1, wherein the high-grade design surface has a surface roughness (Ra) of not more than 0.06 μm and an average amplitude (y) of a surface waviness component of not more than 0.5 μm, and y satisfies the following expression (1) when the average wavelength (x) of the surface waviness component is detected on both side.

$$y \leq 0.0004x^2 + 0.0002x \quad (1)$$

(In the above expression (1), y is the average amplitude (Wa) (μm) of a filtered waviness curve specified in JIS B0610 of the sheet and x is the average wavelength (WSm) (mm) of the filtered waviness curve of the sheet.)

3. The manufacturing process in the above paragraph 1, wherein the thermoplastic resin comprises a polycarbonate resin as the main component.
4. The manufacturing process in the above paragraph 1, wherein the sheet is manufactured by an injection compression molding method in which a molten resin material is filled into a mold cavity from a single gate or from a plurality of gates by a cascade molding system in accordance with a sequential valve gating method.
5. The manufacturing process in the above paragraph 4, wherein the sheet is manufactured by an injection compression molding method in which the molten resin material is filled into the mold cavity from a single gate.
6. The manufacturing process in the above paragraph 1, wherein the step (3) is the step of curving the sheet by using a mold.
7. The manufacturing process in the above paragraph 6, wherein pressure is applied to buffer pressure from the mold surface on the high-grade design surface of the sheet.
8. The manufacturing process in the above paragraph 1, wherein the sheet is a printed sheet at least one side of which is printed with a pattern.
9. The manufacturing process in the above paragraph 1 comprising the step of printing a pattern (step (P)) on at least one side of the sheet between the step (1) and the step (2).
10. The manufacturing process in the above paragraph 1 comprising the step of coating at least one side of the sheet with a hard coating solution (step (C)).
11. The manufacturing process in the above paragraph 1 comprising the step of removing an unrequired portion of the sheet (step (T)).
12. The manufacturing process in the above paragraph 1 comprising the step of attaching another member to the curved member (step (A)).
13. The manufacturing process in the above paragraph 1 comprising the step of fixing the obtained curved member to a final product (step (F)).
14. The manufacturing process in the above paragraph 1, wherein the step (C) and the step (T) are carried out after the step (3) in the mentioned order.
15. The manufacturing process in the above paragraph 1, wherein the curved member is translucent and satisfies the above expression (1).
16. A curved member having a high-grade design surface manufactured by the process of the above paragraph 1.

EXPLANATIONS OF LETTERS OR NUMERALS

Figure 1:
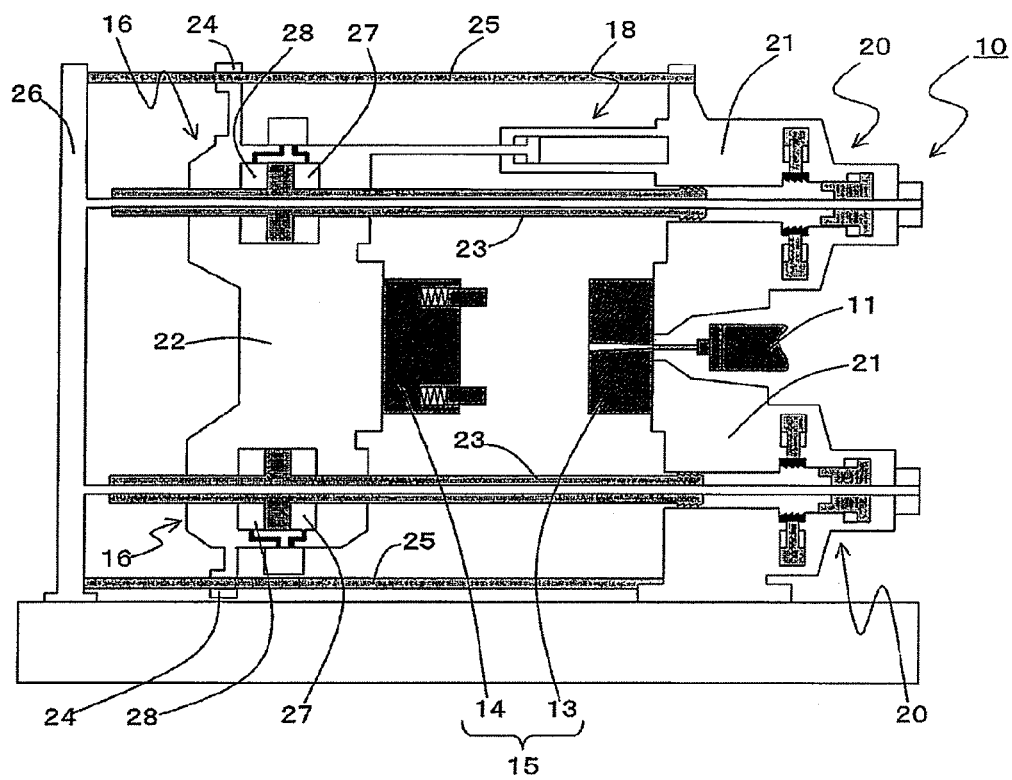
FIG. 1 is a vertical sectional view of a mold clamping apparatus at the time of the start of a molding cycle.

10 mold clamping apparatus
11 first injection device
13 fixed mold
14 movable mold
15 mold apparatus 16 mold clamping mechanism
18 mold opening/closing device
20 engagement device
21 fixed plate
22 movable plate
23 tie bar
24 position sensor
25 guide
26 support plate
27 pressing chamber
28 open chamber
31 molded article obtained by molding
41 sheet substrate
42 hard coat layer (opposite side may not be shown)
43 print layer (opposite side may not be shown)
44 adhesive layer (primer portion is not shown)
51 sheet-α (portion excluding gate portion has a length of 1,000 mm, a width of 600 mm and a thickness of 4.5 mm)
52 gate (width of 120 mm at outer edge portion of sheet, distance from the center of a hot runner gate to sheet outer edge portion of 100 mm, thickness of 4.5 mm)
53 hot runner gate
sheet-β (portion excluding gate portion has a length of 1,000 mm, a width of 600 mm and a thickness of 4.5 mm)
62 gate (thickness of 4.5 mm)
63 first hot runner gate
64 second hot runner gate
65 third hot runner gate
71 sheet after printing
72 black printed window frame portion
73 window light transmission portion (not printed but shown as a portion requiring a high-grade design surface, separate from window frame outer portion)
81 sheet after thermoforming
82 black printed window frame portion (pressure at the time of thermoforming is buffered more than an outer portion thereof)
83 window light transmission portion (pressure at the time of thermoforming is buffered more than an outer portion thereof)
84 unrequired portion (non-design surface portion, receiving a stronger pressure at the time of thermoforming than the design surface)
91 glazing molded article after trimming step
92 black printed window frame portion
93 window light transmission portion

BEST MODE FOR CARRYING OUT THE INVENTION

The present invention will be described in detail hereinunder.

(High-Grade Design Surface)

In the present invention, the term "design surface" means a surface which satisfies the required perspective image state and appearance state in a final product including the member, and the term "high-grade" means that characteristic properties required for the design surface are particularly excellent. Stated more specifically, it means a surface state having higher accuracy than that of a commercially available sheet manufactured by a melt extrusion method.

The high-grade design surface of a sheet preferably has a surface roughness (Ra) of not more than 0.06 μm and an average amplitude (y) of a surface waviness component of not more than 0.5 μm on both sides, and when the average wavelength (x) of the surface waviness component is detected, y preferably satisfies the following expression (1).

$$y \leq 0.0004x^2 + 0.0002x \tag{1}$$

(In the expression (1), y is the average amplitude (Wa) (μm) of a "filtered waviness curve" specified in JIS B0610 of the sheet and x is the average wavelength (WSm) (mm) of the "filtered waviness curve" of the sheet.)

Ra is an arithmetic average roughness measured in accordance with JIS B0610. Preferably, Ra is not more than 0.05 μm and y is not more than 0.4 μm. More preferably, Ra is not more than 0.03 μm and y is not more than 0.3 μm. Particularly preferably, Ra is not more than 0.02 μm and y is not more than 0.2 μm. The lower limit of Ra is preferably 0.001 μm, more preferably 0.002 μm, much more preferably 0.005 μm and the lower limit of y is preferably 0.05 μm, more preferably 0.1 μm in order to achieve the reduction of production cost and the currently required surface state at the same time. According to a more preferred aspect of the present invention, a member having a curved surface after thermoforming has the above surface state.

To manufacture a sheet having a high-grade design surface, a mold having a similar state to the above surface state is used to carry out injection compression molding. Details of the surface state are described in Patent Document 3 and included in this text.

(Resin Material and Sheet)

In the present invention, the resin material contains a thermoplastic resin. More specifically, the resin material is a thermoplastic resin or a composition thereof. The resin material is preferably translucent but may not be translucent. In the field of means of transport such as automobiles, a high gloss is required for outer plate materials, and the manufacturing process of the present invention meets this requirement. For example, a high gloss called "class A" is required for the outer plates of automobiles. Further, when the resin material is translucent, a light diffusion material through which a perspective image is not seen may be used but a resin material having transparency through which a perspective image can be seen is most preferred. A detailed description will be given of the thermoplastic resin hereinafter.

The content of the thermoplastic resin in the resin material is preferably 90 to 100 wt %, more preferably 95 to 100 wt %. The content of a polycarbonate resin in the thermoplastic resin is preferably 90 to 100%, more preferably 95 to 100 wt %.

The sheet has a total light transmittance of preferably not less than 1%, more preferably not less than 2%, much more preferably not less than 4%. The higher transparency of the sheet is more preferred. The upper limit of the light transmittance is preferably 92%. The total light transmittance of the resin plate is a value measured in accordance with JIS K7105. The haze of the sheet is preferably 0.1 to 20%. The upper limit of the haze is preferably 10%, more preferably 5%.

The sheet formed from the resin material preferably has a thickness of 1 to 9 mm. The lower limit of the thickness is more preferably 2 mm, much more preferably 3 mm. The upper limit of the thickness is more preferably 7 mm, much more preferably 6 mm. The maximum projection area of the sheet is preferably 200 to 60,000 cm², more preferably 1,000 to 40,000 cm². The flow length from the gate to the flow end of the sheet is preferably 15 to 300 cm, more preferably 30 to 250 cm. Further, although the sheet is preferably flat, it may have a curved shape when the total cost of all the steps can be reduced efficiently by forming a predetermined curve in the sheet production process. Similarly, although a sheet having a fixed thickness is most versatile and preferred, when it is advantageous that the sheet has a thickness distribution, it may have a thickness distribution.

(Step (1): Sheet Preparation Step)

The step (1) is the step of preparing a sheet having a high-grade design surface by injection compression molding a resin material containing a thermoplastic resin. The sheet is manufactured by an injection compression molding method.

(Injection Compression Molding Method)

The "injection compression molding" includes so-called "injection press molding" and narrowly-defined "injection compression molding". The "injection press molding" refer to a molding method in which a molten thermoplastic resin is supplied into a mold cavity having a larger volume than the volume of a molded article of interest at least at the time of the completion of its supply, the volume of the mold cavity is reduced to the volume of the molded article of interest after the completion of supply, the molded article in the mold cavity is cooled to a temperature or lower at which the molded article in the mold cavity can be taken out, and the molded article is taken out from the mold. The start of reducing the volume of the mold cavity may be either before or after the completion of supply of the resin but preferably before the completion of supply. That is, the step of reducing the volume of the cavity and the step of filling the resin preferably overlap with each other. Meanwhile, the narrowly-defined "injection compression molding" refers to a molding method in which the expanded volume of the cavity is almost equal to the volume of the molten thermoplastic resin and the mold cavity is compressed to the extent of the volume of shrinkage of the molten resin by cooling. In the present invention, injection press molding that produces little distortion and is excellent in mold transferability is preferred for large-sized molded articles.

Further, in the present invention, injection compression molding in which parallelism between a fixed mold and a movable mold is maintained is preferred. As means of maintaining parallelism, a conventional known method can be used.

According to a preferred aspect of the present invention, the following injection compression molding method is employed:

Method-1a: injection compression molding method in which parallelism is controlled by adjusting the expansions and contractions of a plurality of mold clamping mechanisms mounted on a mold fixed plate, or Method-1b: injection compression molding method in which parallelism is controlled by adjusting the expansions and contractions of a plurality of corrective force providing mechanisms which provide corrective force to a mold mounted surface in defiance of the mold clamping force of a mold clamping mechanism.

Since the parallelism control means of the method-1a can maintain parallelism more precisely and can handle large-sized molded articles fully, the method-1a is more preferred in the present invention. The parallelism control means of the method-1b can fulfill its function when it is simply attached to an existing injection molding machine with the result that the method-1b is advantageous as it can suppress the equipment investment cost.

A detailed description is subsequently given of the method-1a. One of the preferred aspects of the above method-1a is an injection compression molding method in which parallelism between molds is maintained by adjusting parallelism between a fixed mold and a movable mold by means of mold clamping mechanisms at the four corners of a mold fixed plate.

In the method of detecting, calculating and controlling parameters required for the maintenance of parallelism, there are the following two preferred aspects of the present invention.

The first preferred aspect is an injection compression molding method in which the average distance between the movable mold and the fixed mold is calculated from detection values of the relative positions of the detected movable plate and the fixed plate when the movable mold is moved parallel to the fixed mold by the mold clamping mechanisms at the four corners of the mold fixed plate, the difference between the detection value of each mold clamping mechanism and the average distance is added to or subtracted from an instruction value to each mold clamping mechanism as a correction value, and an integrated value of the differences is fed back to control parallelism so as to maintain parallelism between the molds.

The second preferred aspect is an injection compression molding method in which the mold clamping forces of the mold clamping mechanisms at the four corners are detected when the movable mold is moved parallel to the fixed mold by the mold clamping mechanisms at the four corners of the mold fixed plate to calculate the average value of the detected mold clamping forces, the difference between the preset target mold clamping force of each mold clamping mechanism and the average value of the above detected mold clamping forces is added to or subtracted from an instruction value to each mold clamping mechanism as a correction value, and an integral value of the differences is fed back to control parallelism so as to maintain parallelism between the molds.

A further detailed description is given of injection compression molding with reference to the accompanying drawings.

(Constitution of Molding Machine)

Figure 2:
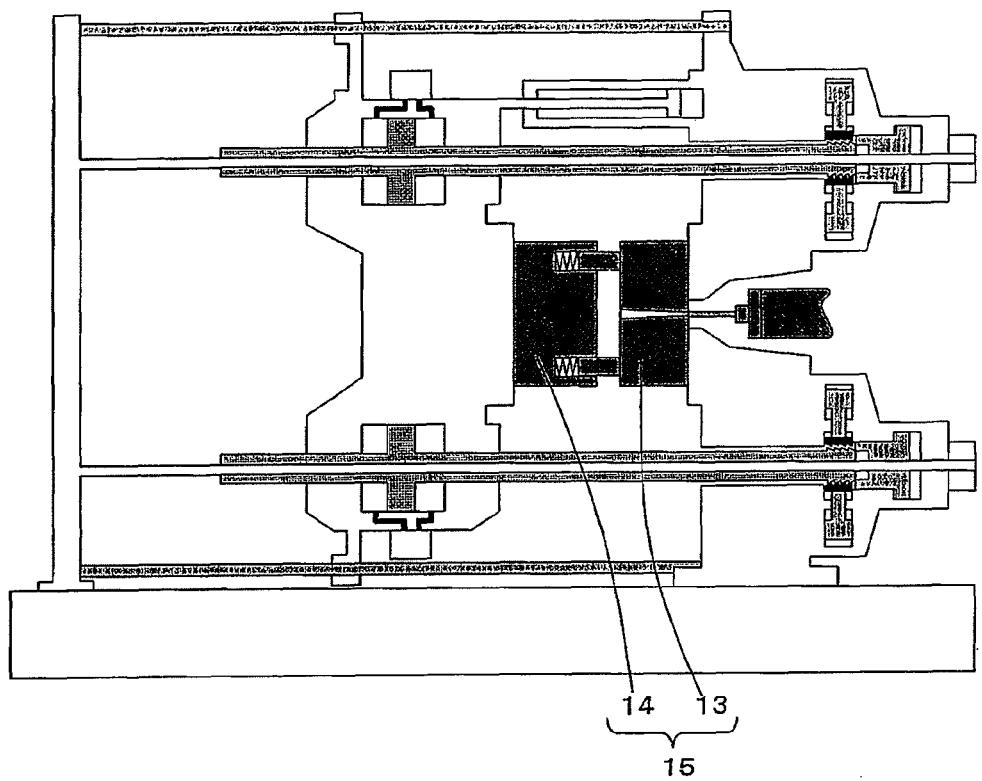
FIG. 2 is a vertical sectional view of the mold clamping apparatus before the start of injection compression molding.
Figure 3:
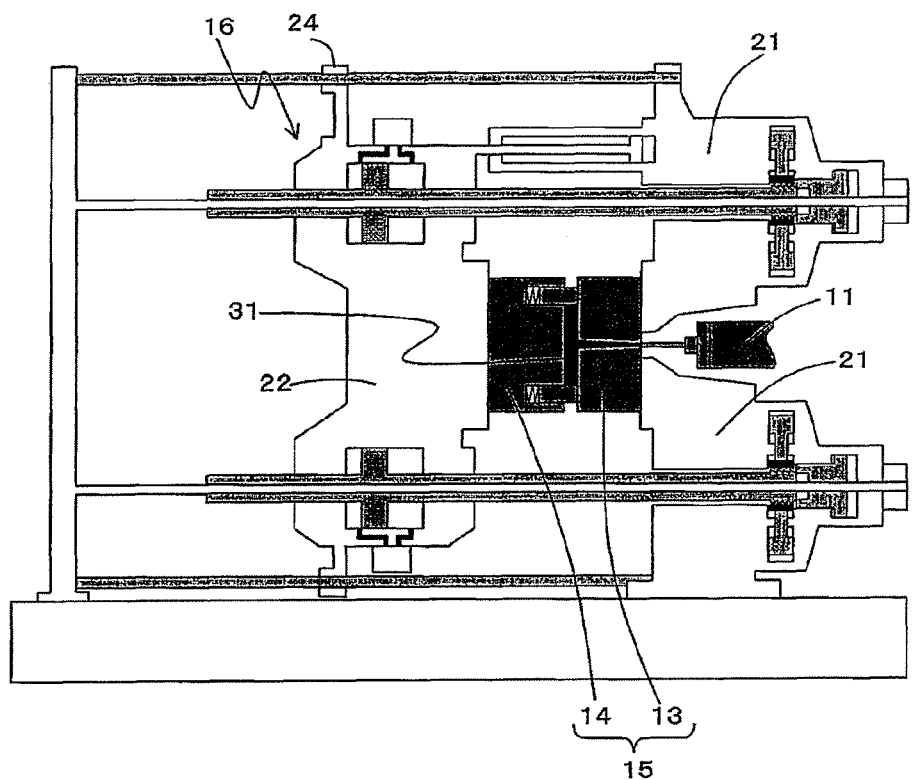
FIG. 3 is a vertical sectional view of the mold clamping apparatus carrying out injection compression molding.

FIG. 1 is a vertical sectional view of a mold clamping apparatus at the time of the start of a molding cycle. FIG. 2 is a vertical sectional view of the mold clamping apparatus before the start of injection compression molding a sheet molded article. FIG. 3 is a vertical sectional view of the mold clamping apparatus carrying out the injection compression molding of the sheet molded article.

The mold clamping apparatus 10 constitutes an injection molding machine together with a first injection device 11. The sheet to be produced may be a multi-layer sheet as required but preferably a single-layer sheet. The production of a single-layer sheet will be described in detail hereinunder.

The mold clamping apparatus 10 comprises (a) a fixed plate 21 which is a mold fixed plate for mounting a fixed mold 13, (b) a movable plate 22 which is a mold fixed plate opposed to the fixed plate 21, for mounting a movable mold 14, (c) mold clamping mechanisms 16 which are each composed of a hydraulic cylinder device having a pressing chamber 27 and an open chamber 28 and are installed near the four corners of the movable plate 22, (d) tie bars 23 formed by extending the rods of the hydraulic cylinder devices of the mold clamping mechanisms 16, (e) engagement devices 20 which are installed at the four corners of the fixed plate 21 on extension parts of the tie bars 23 and provided in the openings of through holes formed in end portions on the fixed plate 21 side of the tie bars 23, (f) a pair of mold opening/closing devices 18, each comprising a hydraulic cylinder device or a servomotor and a ball screw mechanism, which are installed on the top and bottom sides or the front and rear sides of the fixed plate 21 and move the movable plate 22 toward or away from the fixed plate 21, and (g) position sensors 24 which slide over guides 25 fixed between the fixed plate 21 and a support plate 26.

Each of the position sensors 24 is installed in the vicinity of each mold clamping mechanism 16 of the movable plate 22 so that it can detect the distance of the movable plate 22 from the fixed plate 21 at each corner. The mold clamping mechanisms 16 may be installed on the fixed plate 21 or the movable plate 22. A mold apparatus 15 is composed of the fixed mold 13 and the movable mold 14, and the position sensor 24 may be installed at the four positions of the fixed mold 13 and the movable mold 14.

When a second injection device is provided as described above, for example, (1) two injection devices are arranged parallel to each other in a horizontal direction, (2) one injection device is installed upright and the other is arranged horizontally, or (3) two injection devices are arranged horizontally in such a manner that they cross each other. In all of these cases, molding can be carried out by setting independent molding conditions in each of these injection devices.

As for the constitution of a resin flow passage in the mold, the resin is injected from the injection device and filled into the cavity through a hot runner manifold and a gate, or the resin is filled into the cavity through a cold runner and a gate. The numbers of the runners and the gates may be each one or more. Preferably, the resin is filled into the cavity through a single gate. Particularly preferably, the resin is filled into the cavity through a single hot runner manifold and a single gate.

In the case of a plurality of gates, the resin is preferably filled into the cavity through a plurality of hot runner manifolds and the gates. In this case, the resin is preferably filled into the mold cavity by a cascade molding system in accordance with a sequential valve gating method (SVG). In this method, after the molten resin flowing from the previous gate passes through the gate excluding the gate through which the resin first passes, the gate is opened to fill the resin from the gate, carried by a flow of the molten resin. This operation is carried out stepwise in each gate to supply the molten resin. Thereby, a weld line can be suppressed as much as possible though a plurality of gates are used.

This method is preferred because it can reduce the amount of the molten resin from a single hot runner, thereby making it possible to suppress heat generated by shearing the resin and heat accumulation in the hot runner. Therefore, this is preferred when the heat stability of the thermoplastic resin is slightly low. Meanwhile, when compared with the case of a single runner and a single gate, a flow of the resin in the cavity becomes complicated, whereby the density and orientation of the resin in the sheet are apt to become nonuniform. Therefore, a single gate is more advantageous from the viewpoint of the quality of the sheet.

As hot runner gate system, internal heating system and external heating system may be employed, and in the case of the external heating system, open gate system, hot edge gate system and valve gate system may be employed, out of which the valve gate system is preferred as wider molding condition ranges are obtained. When a hot runner of valve gate system is used, a packing member is used to prevent a molten thermoplastic resin from leaking from the sliding part of the valve gate. Examples of the material of the packing member include acrylic rubber, silicone rubber, ethylene-propylene rubber, nitrile rubber and fluorine-based resin, out of which silicone rubber and fluorine-based resin are preferred as they are excellent in heat resistance.

(Formation of Cavity for Molding)

A molding example of a sheet molded article will be described with reference to FIGS. 1 to 3 in the order of steps. FIG. 1 shows the time of the start of a molding cycle. In FIG. 2, the mold is closed by the mold opening/closing devices 18, and the tie bars 23 and the fixed plate 21 are interconnected by a lock device installed on the fixed plate 21 so that the movable mold 14 enters an intermediate clamp state that it is opened by a compression stroke which is the difference between an intermediate clamp state and a final clamp state in the injection step. This is the start time of a molding cycle. The term "injection step" refers to a step from the filling of the molten resin into the mold cavity which corresponds to a product to the completion of supplying the resin to be filled into the cavity.

The width of the compression stroke in the intermediate clamp state is set to ensure that the volume of the cavity in the intermediate clamp state becomes preferably 1.05 to 10 times, more preferably 1.1 to 5 times, much more preferably 1.2 to 2 times the volume of the cavity in the final clamp state. Since the width of the compression stroke in the intermediate clamp state is large as described above, the injection ratio can be reduced, the distortion of a molded article can be suppressed, and an expensive high-speed high-pressure injection device does not need to be used as the injection device 11. When the volume of the cavity in the above intermediate clamp state is less than 1.05 times the volume of the cavity in the final clamp state and the resin is to be filled into the cavity in the injection step, a high pressure is concentrated on the resin near the gate, thereby readily causing the distortion and thickness nonuniformity of a molded article. When the volume of the cavity in the intermediate clamp state exceeds 10.0 times the volume of the cavity in the final clamp state, a molding failure such as jetting is apt to occur.

When the thickness of a molded article is larger than a predetermined value, the stop position of the movable mold 14 in the intermediate clamp state may be a position at which the movable mold 14 is advanced to the final clamping step without the intermediate clamp state in which the movable mold 14 is opened by the compression stroke. Then, the movable mold 14 is moved backward by receiving an injection pressure in the injection step to expand the volume of the cavity so as to ensure a subsequent compression stroke, thereby making it possible to carryout injection compression molding.

(Injection Step and Compression Step)

In FIG. 3, the molten resin is injected from the injection device 11 into the cavity formed in FIG. 2. This step is an injection step, followed by a compression step which is carried out as a continuous step or a step which is continuous and partially concurrent with the latter half of the injection step. The duration ($t_0$ (seconds)) during which compression operation and the injection and supply of the resin are carried out simultaneously is generally called "overlap time". When the compression step is started concurrently with the latter half of the injection step, the screw advance position is detected and compression is started by the mold clamping mechanisms when the screw advance position reaches the set position. The compression step is carried out by compressing the molten resin injected in the injection step by the mold clamping mechanisms 16 to reduce the volume of the cavity and flatting the molten resin in the cavity to fill the cavity. Then, the sheet molded article 31 is formed. The overlap time ($t_0$) is preferably 2 seconds or less, more preferably 1 second or less. $t_0$ is preferably 0.05 second or more, more preferably 0.1 second or more. Further, the compression start time in the case of overlapping is when the volume ratio of the resin filled becomes preferably 90 to 99.9%, more preferably 95 to 99.5%, much more preferably 97 to 99% of the total volume of all the resin to be filled in the present invention.

(Injection Ratio of Molten Resin in Injection Step)

In the above injection step, the injection ratio of the molten resin to be filled into the cavity formed in FIG. 2 from the injection device 11 is preferably 50 to 2,000 cm³/sec, more preferably 100 to 1,800 cm³/sec, much more preferably 150 to 1,500 cm³/sec. When the injection ratio is lower than 50 cm³/sec, the time for filling the molten resin into the cavity becomes long, and the temperature of the resin drops when it moves from the injection step to the compression step, whereby the melt viscosity becomes too high, thereby readily causing the occurrence of a poor appearance such as a short shot or a flow mark, or low accuracy of thickness or size in the compression step. When the injection ratio is higher than 2,000 cm³/sec, a distortion is apt to remain in the obtained molded article and a poor appearance such as a silver streak caused by the inclusion of air tends to occur. The term "injection ratio" as used herein is a value obtained by dividing the volume of the resin injected into the mold cavity by the time required from the start of injection till the end of injection and does not always need to be a constant value.

(Control of Parallelism Between Molds in Compression Step)

In the above compression step, parallelism between molds is maintained by controlling parallelism between the fixed mold and the movable mold by the mold clamping mechanisms at the four corners of the mold fixed plate. Preferably, the average distance between the movable mold 14 and the fixed mold 13 is calculated from the detection values of the relative positions of the movable plate 22 and the fixed plate 21 detected by the position sensors 24, the difference between the detection value of each mold clamping mechanism and the average distance is added to or subtracted from an instruction value to each mold clamping mechanism 16 as a correction value, and an integral value of the differences is fed back for control so as to maintain parallelism between the movable mold 14 and the fixed mold 13. As a result, the molten resin flows in the cavity uniformly at a high speed, whereby the distortion of the sheet molded article 31 is reduced by the effect of compression molding and the thickness of the sheet becomes uniform and highly accurate by the effect of controlling parallelism.

In the above compression step, in place of the above method in which parallelism between molds is maintained based on the detection values of the relative positions of the movable plate 22 and the fixed plate 21 by the position sensors 24, the following method is preferably employed. That is, when the movable mold 14 is moved parallel to the fixed mold 13 by the mold clamping mechanisms 16, the mold clamping forces of the mold clamping mechanisms 16 are detected to calculate the average value of the detected mold clamping forces, the difference between the preset target mold clamping force of each mold clamping mechanism and the average value of the above detected mold clamping forces is added to or subtracted from an instruction value to each mold clamping mechanism as a correction value, and an integral value of the differences is fed back for control to maintain parallelism between molds. Further, a combination of these both methods is also preferably used to control parallelism between molds more accurately. When both position control and mold clamping force control (pressure control) are carried out in combination, until the average distance between the movable mold 14 and the fixed mold 13 from the intermediate clamp position becomes a predetermined distance, or until the average value of detected mold clamping forces becomes a predetermined pressure, control of parallelism may be carried out by the above position control and after the detection of a predetermined distance or a predetermined pressure, the above pressure control may be carried out. Alternatively, after control of parallelism is carried out by position control, position control and pressure control may be carried out simultaneously. When position control and pressure control are used at the same time, position control is used only for feed-back control and pressure control is used for at least one of feed-back control and feed-forward control.

When only position control is carried out, the average distance between the movable mold 14 and the fixed mold 13 is calculated from the detection values of the relative positions of the movable plate 22 and the fixed plate 21 detected by the position sensors 24, the difference between the detection value of each mold clamping mechanism and the average distance is added to or subtracted from an instruction value to each mold clamping mechanism 16 as a correction value, an integral value of the differences is fed back for control, and also feed-forward control is added to each mold clamping mechanism 16 to carry out mold clamping by attaching importance to the speed while parallelism between the movable mold 14 and the fixed mole 13 is maintained.

In the above compression step, to maintain parallelism between molds by controlling parallelism between the fixed mold and the movable mold by the mold clamping mechanisms at the four corners of the mold fixed plate, a master-slave system in which a mold clamping mechanism at one corner is used as a master and the other mold clamping mechanisms are used as slaves is also preferably employed. However, in the case of a large-sized sheet molded article which requires more highly accurate control of parallelism, the above two methods are more preferred than the master-slave system.

In the compression step, particularly when a large-sized sheet is to be molded, it is important that parallelism between molds should be maintained in the intermediate clamp state and during the time from the intermediate clamp state to the final clamp state. To obtain a large-sized sheet, a heavy mold is inevitably attached to the movable plate 22 and the fixed plate 21 to carry out molding in many cases, and it becomes more difficult to maintain parallelism by the mold clamping mechanisms 16 of the molding machine as the weight of the mold increases. An unbalanced load which is generated by pressure at the time of filling the resin causes nonuniformity in the thickness of a molded article, and this effect appears prominently in a large-sized sheet. Further, the maintenance of parallelism between molds achieves a uniform pressure load on the resin in the mold. Thereby, pressure applied to the resin becomes low as a whole, and a molded article having little distortion can be provided. When parallelism between molds is not satisfactory, pressure applied to a sheet molded article during molding varies locally, which becomes one of the causes of producing distortion and warping the sheet. From the viewpoint of productivity, a failure to attain parallelism causes the scuffing of the mold, thereby making the mass-production of products difficult.

(Moving Speed of Movable Mold in Compression Step)

In the compression step, the volume of the cavity is compressed by the mold clamping mechanisms 16 to be reduced and the molten material is flatted in the cavity to fill the cavity. The moving speed of the movable mold at this point is preferably not less than 5 mm/sec, more preferably not less than 7.5 mm/sec, much more preferably not less than 10 mm/sec. A molded article having a higher L/D needs a higher expansion ratio of the volume of the mold and requires a higher moving speed. To reduce the distortion of a sheet molded article, it is important that the compression step up to the predetermined final clamp state should be ended while the thermal distribution of the molten resin in the cavity is narrow. As the moving speed is higher, the compression stroke becomes larger. Therefore, the moving speed is preferably as high as possible but about 40 mm/sec is the limit of the apparatus at present. When the moving speed is 35 mm/sec, precision speed control is fully possible. The moving speed is a value obtained by dividing a compression stroke from the intermediate clamp state to the final clamp state by the time required for compression and does not always need to be constant. As the compression stroke becomes larger and the moving speed of the mold becomes higher, the scuffing of the mold is more apt to occur. Therefore, the maintenance of parallelism between molds is important and essential.

(Pressure Holding Step)

In the compression step, the volume of the cavity is compressed by the mold clamping mechanisms 16 to be reduced and the molten material is flatted in the cavity to fill the cavity, whereby the repulsive force of the resin quickly rises. At this point, control by the mold clamping mechanisms 16 may be switched from the above position control to the above pressure control. When the control is switched to pressure control, it is desired to control the pressure (surface pressure) in the cavity to 7 to 20 MPa. In general, the hydraulic pressure of a hydraulic cylinder or a pipe thereof is detected and clamping force is divided by the projection area of a molded article to obtain a surface pressure. A resin pressure sensor may be installed in the cavity.

To maintain the volume of the cavity in the final clamp state while a suitable pressure overcoming the repulsive force is applied, a pressure holding step is carried out as a step continuous to the compression step or a step which is continuous and partially concurrent with the latter half of the compression step. In this pressure holding step, an extremely appropriate amount of the resin is filled into the volume of a sheet molded article of interest by the injection device 11 at a uniform density, and the sheet becomes preferred with very little warp or distortion. The application of pressure (pressurization) to the resin is due to the advance force of the movable mold by the mold clamping mechanisms 16. Although the pressure is generally transmitted by direct contact between the advancing member and the resin, a pressure transmission medium such as a fluid may be existent between them.

The appropriate time of holding the above pressure depends on the thickness of a molded article, and as the thickness increases, the appropriate time becomes longer. In the case of a large-sized molded article, this tendency becomes remarkable. In the case of a large-sized molded article of interest in the present invention, when the thickness of the molded article is represented by t (mm), the holding time X (seconds) suitably falls within a range which satisfies the following equation (I). For example, when the preferred sheet of the present invention has a thickness of 5 mm which is an intermediate value of the range of 1 to 9 mm, the holding time is preferably 160±30 seconds. However, when a system for quickly heating and cooling the mold temperature, as typified by a heat and cool molding method, is used, the above equation cannot be used.

$$X=(30 \times t+10) \pm 30 (\text{seconds}) \tag{I}$$

In the present invention, a technique of heating part of the surface of the cavity at a high temperature to delay the development of a solidified layer at the time of molding, as typified by the above quickly heating and cooling system, may also be used in combination. By using this technique, the transferability of the surface of the mold is further improved and a high-grade design surface can be formed though the molding cycle increases. Preferred typical examples of the technique include one in which a heat-insulating layer made of a heat-resistant resin, ceramic or glass is formed on the surface of the cavity and one in which the mold temperature is controlled by switching between a high-temperature catalyst and a low-temperature refrigerant, as typified by a heating and cooling molding method.

(Cooling Step)

The pressure holding step is followed by a cooling step. The sheet molded article in the cavity is cooled to a temperature at which it can be taken out and then taken out. When the mold is opened to take out the molded product, the above control of parallelism is carried out until a predetermined intermediate position is reached. The intermediate position is generally the above intermediate clamp position. To suppress the production of a warp by the own weight of the resin sheet, the molded product is cooled to a temperature lower than the deflection temperature under load, preferably a temperature 30° C. to 60° C. lower than the deflection temperature under load of the thermoplastic resin to be taken out from the cavity. For example, in the case of a bisphenol A type polycarbonate resin, a range of 75° C. to 105° C. is preferred, and a range of 80° C. to 100° C. is more preferred. During this cooling step, the pressure of the pressure holding step may be kept, no pressure may be applied, or pressure may be reduced stepwise during the cooling step. A sink mark or thickness nonuniformity of the sheet molded article can be prevented by carrying out position control or pressure control by means of the mold clamping mechanisms 16 even during the cooling step.

(Step (2): Preheating)

The step (2) is the step of preheating the prepared sheet at a temperature of [Tg+5]° C. to [Tg+70]° C. (Tg is the glass transition temperature of the thermoplastic resin) to soften the sheet. As for preheating, the sheet prepared in the step (1) may be directly heated. The printed sheet, hard coated sheet or roughly trimmed sheet may be preheated. The printed sheet is preferably preheated.

A sheet which has been injection compression molded and preferably subjected to predetermined inspection is generally masked for the protection of its surface during storage and conveyance and carried to the next step. When another step such as a printing step is carried out previously, the same treatment is generally carried out. Prior to preheating, the masking is preferably removed.

Conventionally known heating means may be used for preheating. For example, an air forced circulation heating furnace, an infrared heater and a microwave heater may be used. Out of these, an air forced circulation heating furnace is preferred because even a large-sized sheet is heated uniformly and completely and equipment cost is low. A plurality of heating means may be used sequentially or at the same time.

The heating temperature is [Tg+5]° C. to [Tg+70]° C. (Tg (° C.) of the thermoplastic resin). In the air forced circulation heating furnace, the temperature of the heating furnace is set to the above range to carry out the above treatment for a predetermined time so as to keep the sheet at a suitable temperature for thermoforming. The temperature range is preferably [Tg+5]° C. to [Tg+50]° C., more preferably [Tg+10]° C. to [Tg+35]° C., much more preferably [Tg+15]° C. to [Tg+25]° C. In the case of a bisphenol A type polycarbonate resin material (containing about 1 wt % of an additive), since Tg is about 150° C., the above temperature is 155 to 220° C., preferably 155 to 200° C., more preferably 160 to 185° C., much more preferably 165 to 175° C. When the above temperature is lower than the above lower limit, it takes time to fully soften the molded article with the result of a reduction in production efficiency. In addition, forced bending provokes the distortion and the deterioration of the dimensional accuracy of the molded article. When the above temperature is higher than the upper limit, the relaxation of the molecular chain quickly occurs on the surface of the sheet, thereby making it impossible to retain the initial high-grade surface state. Therefore, the above temperature range is preferred in order to obtain good balance between production efficiency and the surface state and dimensional accuracy of a thermoformed product.

When the heating time is too long, a great reduction in surface accuracy and hanging deformation by own weight occurs in no small measure. Since uniform heating takes more time as the sheet becomes thicker, it is preferred to set the above more preferred temperature range as the thickness increases. Stated more specifically, when the thickness of the sheet of the present invention is 4.5 mm which is the average value of the above preferred thickness range of 3 to 6 mm and the ambient temperature of the heating furnace is 20° C. higher than Tg, the heating time is about 690 seconds, when the ambient temperature is 30° C. higher than Tg, the heating time is about 440 seconds, and when the ambient temperature is 40° C. higher than Tg, the heating time is about 270 seconds. More generally, the relationship between the difference x (° C.) between the ambient temperature in the heating furnace and Tg of the thermoplastic resin and the treatment time y (seconds) satisfies preferably $y=[(0.4x^2-45x+1430)\times(z/4.5)^2]\pm 150$, more preferably $y=[0.4x^2-45x+1430)\times(z/4.5)^2]\pm 100$ when the thickness of the sheet is represented by z (mm).

Preferably, as the radius of the curvature of the curved member is smaller, the sheet is made softer. When the radius of curvature is represented by r (mm), the above x (° C.) preferably satisfies the following expression.

$$190-(r/100) \leq Tg+x \leq 220-(r/100)$$

The sheet to be heated may be laid horizontally or hung vertically. The glass transition temperature (Tg (° C.)) of the thermoplastic resin is measured by the method specified in JIS K7121 and can be recognized in the DSC chart. When two or more glass transition temperatures appear due to the thermoplastic resin consisting of two or more resins, the glass transition temperature is the highest one.

(Step (3): Formation of a Curved Surface)

The step (3) is the step of curving a high-grade design surface by applying pressure to the softened sheet. In the preheating step (step (2)), heating is carried out while the high-grade design surface of the sheet is maintained and, in the step (3), the sheet is transformed without impairing the design surface.

The degree of the curvature is preferably 500 to 30,000 mm, more preferably 1,000 to 25,000 mm, much more preferably 1,500 to 10,000 mm in terms of the radius of curvature. The effect in the manufacturing process of the present invention is produced more on a relatively gently curved surface.

To form a curved surface, vacuum forming, air-pressure forming and press molding may be used. Out of these, press molding is preferred as it can be applied to a relatively thick sheet without impairing the surface of the sheet. Press molding refers to a method for obtaining a predetermined shape by pressurization using a mold or a frame when a heated sheet is to be transformed. In general, a mold and other necessary mechanical devices are driven by using a mechanical drive unit. As the drive unit may be used a pneumatic or hydraulic piston, a pneumatic or hydraulic motor, an electric motor and an ultrasonic motor. As the electric motor, not only an ordinary motor but also a servo motor capable of controlling the position of the motor itself may be used according to purpose. In the case of a motor, a conversion mechanism such as a combination of an ordinary ball screw and a screw is used to convert rotational movement into linear movement. Out of these, a hydraulic piston is used most widely and preferred in the present invention. The mold may be composed of only a male mold but a structure that a male mold and a female mold are mated with each other is preferred to enhance dimensional accuracy after thermoforming. That is, a sheet is sandwiched between a male mold and a female mold to carry out press molding. The surface states of the male mold and the female mold do not need to satisfy the above expression (1). It is the greatest advantage in the present invention that a high-accuracy mold is not required as the mold used in the thermoforming step.

To carry out bending without impairing the design surface of a sheet as much as possible even by using a mold having low accuracy, when the sheet is to be transformed by using the mold, pressure is preferably applied to buffer pressure from the surface of the mold on the high-grade design surface. The following (a) to (e) are given as preferred examples of the molding method.

(a) A method typified by grease forming; that is, a mold is covered with an elastic flexible sheet which can be impregnated with a liquid, such as felt or flannel, impregnated with a liquid such as grease to buffer pressure from the surface of the mold by the liquid.

(b) A method typified by the method described by JP-B 6-77961; That is, a method using a mold having a coating layer into which a curable liquid elastomer component such as curable liquid silicone rubber is impregnated and cured as the liquid in (a) above.

(c) A method using a mold having a coating layer of an elastomer directly formed on the surface of the mold.

(d) A method called "ridge forming"; that is, a method in which at least a mold comprising a skeleton frame and not a solid mold is used and the skeleton frame is brought into contact with a non-design surface portion so that the non-design surface has no contact with the mold.

(e) A method in which a curved surface is formed by applying higher pressure to a non-design surface portion than a design surface portion.

The above method (a) is preferred as the degree of shape freedom is high but a cleaning step is required after molding. The above method (d) has a limited degree of shape freedom. Therefore, out of the above methods, the methods (b), (c) and (e) are more preferred and the method (e) is particularly preferred as it is simple.

Examples of the method in which a curved surface is formed by applying higher pressure to a non-design surface portion than a design surface portion are given below.

(e-1): A method in which a hard coating layer is formed on the non-design surface portion and a soft coating layer is formed on the design surface portion.

(e-2): A method in which a coating layer having a large contact area is formed on the non-design surface portion and a coating layer having a small contact area is formed on the design surface portion by roughening the surface or scattering contact dots.

(e-3): A method in which the thickness of the coating layer of the non-design surface portion is made larger than the thickness of the coating layer of the design surface portion to reduce pressure on the design surface portion.

Out of these, the simplest method (e-3) is preferred. Examples of the coating layer include an elastomer layer and an elastic layer, out of which the elastic layer is preferred because it can be most easily used. Examples of the elastic layer include layers made of knitted cloth, woven cloth or nonwoven cloth composed of natural fibers, synthetic fibers or inorganic fibers, layers formed by implanting short fibers and porous foamed resin layers. Layers made of flannel and felt are particularly preferred.

A more preferred example of the above method (e-3) is a method in which an elastic flexible sheet is bonded to the surface of at least one of the molds and a mold having the elastic flexible sheet for the non-design surface portion to which a high pressure is to be applied and which has a thickness larger than the thickness of the design surface portion is used. The difference in the thickness of the sheet is preferably 0.1 to 3 mm, more preferably 0.2 to 2 mm, much more preferably 0.3 to 1 mm. In this method, the pressure of a portion to which a high pressure is to be applied is preferably 0.05 to 2 MPa.

The mold used for press molding may be any one of wooden, plaster, resin and metal molds, and the latter molds have a longer service life but higher production cost. Therefore, a mold material can be selected in consideration of these. The wooden mold may be any one of a single-layer mold, a multi-layer plyboard and a hard board and is preferably surface treated with varnish to protect its surface. The resin mold is preferably made of a thermosetting resin, and a reinforced resin containing or not containing a reinforcement material may be used. As the thermosetting resin may be preferably used an unsaturated polyester resin, phenol resin, epoxy resin and polyurethane resin. The metal mold is preferably an aluminum mold having excellent cuttability. Although the mold temperature at the time of press molding may be normal temperature without controlling it, a heater or a heating medium may be used to control the temperature.

The method of positioning a sheet in the mold is described hereinunder. Particularly when the sheet is printed, the sheet must be located at a predetermined position accurately. Preferred examples of the method of positioning include one in which the position of mounting the sheet to a clamp and the position of the mold are accurately input into the program of a conveyer device to mount the sheet to the clamp accurately by using a jig and one in which the position of the sheet or the position of printing is read by a sensor when the sheet is set in the mold and fed back to control the position of a clamp. Although any one of the methods may be used in the present invention, the former method is preferred as the equipment is simple as a whole.

(Order of the Other Steps)

The member of the present invention can be manufactured by combining the steps in the following order.
(order 1):
sheet preparation/coating/printing/preheating/thermoforming
(order 2):
sheet preparation/coating/preheating/thermoforming/printing
(order 3):
sheet preparation/preheating/thermoforming/printing/coating
(order 4):
sheet preparation/preheating/thermoforming/coating/printing
(order 5):
sheet preparation/printing/coating/preheating/thermoforming
(order 6):
sheet production/printing/preheating/thermoforming/coating Since a hard coating composition is not contaminated by an ink regardless of the type of the ink as in the above orders 1, 2 and 4 in which coating is carried out before printing, the choices of the type of the ink and the hard coating composition become wide. When printing is carried out before coating as in the orders 2, 3 and 6, the ink layer must be treated by durable masking in the hard coating step in advance (the hard coat layer is not substantially formed on the ink layer), or a combination of an ink and a hard coating composition must be selected to prevent the ink from being deteriorated or dissolved by the hard coating composition. When this combination can be selected, the degree of freedom of the order is enhanced. Since hard coating may be carried out by a plurality of times of coating and baking, it is desired that the masking material should enable satisfactory hard coating without being greatly deformed at the time of baking and the amount of the residual starch should be as small as possible after the removal of the masking material. A masking material which has the above features preferably comprises a polyolefin as a base material and has a tackiness of 1 to 6 N/10 mm. The tackiness is preferably 1 to 3 N/10 mm. Preferred examples of the masking material include parting masking tape Nos. 4240 and 4241 manufactured by Tesa Tape Co., Ltd. The parting masking tape No. 4241 is particularly preferred.

When coating is carried out before thermoforming as in the above orders 1, 2 and 5, the general versatility and production efficiency of coating can be enhanced advantageously but the hardness or life period of a hard coat layer are limited to a relatively low value or a relatively short period disadvantageously. Examples of a hard coat agent which makes possible the above orders include active energy line curable resins such as melamine resin and photo-curable resins. In the case of the latter, the resin is cured by active energy line after the thermoforming step. For example, when high hardness and durability are not required for one of the both sides of a member, the above orders can be adopted. When thermoforming is carried out before coating as in the above orders 3, 4 and 6, the type of a hard coating composition is not limited and therefore, a most suitable hard coat layer can be freely formed as a protective layer for a molded article.

When thermoforming is carried out before printing as in the orders 2, 3 and 4, an ink layer having low elongation and low heat resistance can also be used with the result that an ink having a small environmental load can be used advantageously. However, as a curved surface is to be printed, the control of printing becomes complicated disadvantageously. When printing is carried out before the thermoforming step as in the orders 1, 5 and 6, printing can be made more efficient and the printing accuracy can be enhanced advantageously.

Out of the above orders, the orders 3, 4 and 6 are preferred because the degree of freedom of the hard coat layer can be increased in the present invention. Further, the order 6 is most preferred because printing can be made more efficient. Further, either one of a method in which rough trimming is carried out after printing and final trimming is further carried out after hard coating and a method in which trimming is carried out at one stroke after hard coating may be selected. When rough trimming is carried out, the thermoplastic resin can be removed and collected before a hard coat layer is formed, which is advantageous from the viewpoint of recyclability. The method in which hard coating is carried out on a product which is not final with a large proportion of a non-design surface widens the choice of the hard coating method, enables the precise control of the thickness of the hard coat layer and can reduce a failure caused by hard coating, thereby improving the overall yield, reducing the cost and saving resources. Therefore, in the present invention, the step (C) and the step (T) are preferably carried out after the step (3) in the mentioned order.

(Step (P): Printing Step)

The step (P) is the step of printing a pattern on at least one side of the sheet.

In the printing step, the printing method is not particularly limited and a conventionally known method may be used to print the surface of a flat sheet or a curved sheet. Examples of the printing method include offset printing, flexo printing, gravure printing, screen printing and ink jet printing. Out of these, screen printing is most preferred in the present invention. The screen printing has the following advantages. Firstly, the screen printing has high productivity and can be used to print a large-sized material. Secondly, the screen printing facilitates multi-layer coatings and has a wide allowable range of the thickness of a print layer. Thirdly, the screen printing can be used to print a curved surface relatively easily.

The thickness of the print layer in the present invention is preferably 3 to 40 µm, more preferably 5 to 35 µm. Within the above range, the predetermined object of the print layer such as a light blocking effect can be well balanced with work efficiency and a print appearance. Further, printing may be carried out by not only a one-layer coating but also two or more-layer coatings. For multi-layer coatings, either one of a method in which each layer is dried and baked at a high temperature and a method in which multiple layers are coated and dried only with air and the baking step is carried out after the end of all coatings may be selected. A screen plate for printing may be a plate made of cotton, nylon or polyester fibers or an electroformed plate, out of which a plate made of nylon fibers or polyester fibers is preferred. These fibers may include yarn surface treated with carbon. Fibers may be monofilament fibers or multifilament fibers, out of which monofilament fibers are preferred. The type of the yarn may be selected from S, T and HD. Further, the plate may be made of fibers having high water-repellency or oil-repellency or fibers treated with a surface treating agent having the above property in order to enable the ink to be well removed from the plate, prevent clogging and form a smooth printed surface.

Various inks may be used for the print layer. For example, the binder component of the printing ink used for printing may comprise a resin-based component or an oil-based component as the main component, and examples of the resin component include natural resins such as rosin, gilsonite, shellac and kovar, and synthetic resins such as phenol-based resin and derivatives thereof, amino-based resin, butylated urea, melamine resin, polyester-based alkyd resin, styrene resin, acrylic resin, phenolic resin, epoxy resin, polyamide resin, polycarbonate resin, saturated polyester resin (including polyester elastomers), amorphous polyarylate resin, amorphous polyolefin resin, vinyl chloride resin, vinyl acetate resin, vinyl chloride-vinyl acetate copolymer resin, butyral resin, methyl cellulose resin, ethyl cellulose resin and urethane resin. When a pigment or a dye is contained in the printing ink, a desired color can be obtained.

Out of the above resins, vinyl chloride-vinyl acetate copolymer resin, acrylic resin, polycarbonate resin, polyester elastomers, two-component urethane resin comprising an acrylic polyol and a polyisocyanate, and two-component urethane resin comprising a polyester polyol and a polyisocyanate are preferred as ink binders from the viewpoints of heat resistance, affinity for polycarbonate as the main component of a preferred thermoplastic resin, durability to a hard coating solution and follow-up property at the time of thermoforming. These ink binders may be used alone or in combination of two or more.

Out of these, two-component urethane resins are preferred, and a two-component urethane resin comprising an acrylic polyol and a polyisocyanate is particularly preferred. The preferred printing ink and other details will be described hereinafter.

(Step (C): Coating Step)

The step (C) is the step of coating at least one side of the sheet with a hard coating solution.

As the coating technique, dip coating, flow coating, blade coating, knife coating, squeeze coating, transfer roll coating, gravure roll coating, air spray coating, electrostatic spray coating and spin coating techniques may be used. A transfer technique may be used as another technique except for coating techniques for applying a coating component. In this technique, a laminate sheet having a hard coat layer and a layer for bonding the hard coat layer to a molded article on release paper is prepared and laminated with the molded article so that the hard coat layer can be made existent on the molded article. Out of these, dip coating and flow coating techniques are preferred. In the present invention, when the hard coating step is carried out before the final trimming step, nonuniformity in the thickness of the hard coat layer and a pool at the end portion of a product are easily eliminated advantageously. Particularly in the flow coating technique, the hard coating solution flows from the non-design surface toward the design surface, thereby making it easy to reduce nonuniformity in film thickness advantageously.

(Hard Coat Layer)

A description is subsequently given of the hard coat layer of the present invention. In the present invention, various hard coating agents may be used. A silicone resin-based hard coating agent and an organic resin-based hard coating agent are such examples.

The silicone resin-based hard coating agent is used to form a cured resin layer having a siloxane bond. Examples of the silicone resin-based hard coating agent include a partial hydrolytic condensate of a compound containing a compound (such as a trialkoxysilane compound) corresponding to a trifunctional siloxane unit as the main component, preferably a partial hydrolytic condensate containing a compound corresponding to a tetrafunctional siloxane unit (such as a tetraalkoxysilane compound) and/or a compound corresponding to a bifunctional siloxane unit, and a partial hydrolytic condensate charged with these and a metal oxide fine particle such as colloidal silica. The silicone resin-based hard coating agent may further contain a monofunctional siloxane unit. Although they contain an alcohol generated at the time of a condensation reaction (in the case of a partial hydrolytic condensate of an alkoxysilane), they may be dissolved or dispersed in an arbitrary organic solvent, water or a mixture thereof as required. Examples of the organic solvent for this purpose include lower fatty acid alcohols, polyhydric alcohols, and ethers and esters thereof. A leveling agent may be added to the hard coat layer in order to obtain a smooth surface state. As the metal oxide fine particle may be used at least one selected from zinc oxide, cerium oxide, tungsten oxide and titanium oxide in addition to colloidal silica. When it is used in combination with colloidal silica, the hardness, transparency and weather resistance of the hard coat are improved in a balanced manner. The particle diameter of the fine particle is preferably 1 to 500 nm, more preferably 10 to 100 nm.

Examples of the organic resin-based hard coating agent include melamine resin, urethane resin, alkyd resin, acrylic resin and polyfunctional acrylic resin. Examples of the polyfunctional acrylic resin include polyol acrylate, polyester acrylate, urethane acrylate, epoxy acrylate and phosphagen acrylate. Out of these, an ultraviolet curable hard coating agent is preferred. Further, an ultraviolet absorbing compound and/or an optically stable compound are/is preferably mixed with or incorporated into the resin forming the hard coating agent through copolymerization. A more preferred organic resin-based hard coating agent provides a hard coat layer by copolymerizing the above monomer with an alkyl (meth)acrylate monomer.

The number of the hard coat layers may be one, or two or more. The coating solution comprises solid matter which substantially forms a layer and an organic solvent and may further comprise water. The SP value (solubility parameter value) of the organic solvent for the coating solution is preferably 18.5 to 22 $(MPa)^{0.5}$, more preferably 19.5 to 21.5 $(MPa)^{0.5}$. Within this range, the reduction of a bad influence on a base material such as polycarbonate resin of the organic solvent and the improvement of solubility for solid matter can be attained at the same time. The SP value of the organic solvent in the present invention is calculated based on calculation from the chemical composition of "Basic Science of Coating", p. 51 (1977) written by Yuji Harazaki. Preferred examples of the organic solvent include alcohols and ketones.

Various organic polymers which have been used for coating may be used in the hard coat layer which is composed of a single layer. Out of these, curable polymers which comprise a polyfunctional acrylic polymer as the main component and organic-inorganic composites comprising an organic polymer and a metal oxide fine particle are preferably used in the present invention. Preferred examples of the polyfunctional acrylic polymer include polymers which comprise a constituent unit derived from methyl methacrylate as the main component and form a crosslinked structure through self-crosslinking by various functional groups and a reaction with another crosslinking component. As the functional groups which contribute to the formation of the crosslinked structure may be used conventionally known functional groups such as double bond, hydroxyl group (for example, crosslinking through a reaction with methylol melamine and polyisocyanate) and carboxyl group (for example, crosslinking through a reaction with polyepoxy). The organic-inorganic composites include (i) a mixed composite of an organic polymer and a surface treated metal oxide which can be dispersed into the polymer, (ii) a composite in which an organic polymer and a metal oxide surface treated with a surface treating agent having a functional group able to be reacted with the polymer are bonded together by a reaction, (iii) a composite in which a polymer matrix is formed through a reaction between functional groups of a metal oxide surface treated with a surface treating agent having the functional groups or a reaction between the functional group and another reactive monomer or polymer, and combinations thereof.

A typical example of the hard coat layer which is composed of two or more layers is a hard coat layer which comprises at least a primer layer and a top layer. The primer layer firmly bonds the above base layer to the top layer and improves the weather resistance of the bond between the primer layer and the top layer and of the base layer when it contains an ultraviolet absorbent in a high concentration. Further, it has the function of lessening the difference in thermal expansion between the top layer and the base layer to prevent the cracking of the top layer. The hard coat layer may be composed of three or more layers to further enhance the function of the primer layer. Preferably, the hard coat layer of the present invention comprises a primer layer made of an acrylic resin and a top layer made of a silicone-based resin as will be described hereinafter.

A detailed description will be given of the preferred hard coating agent and the preferred hard coat layer hereinafter.

Further, the hard coat layer may be formed by a method other than the above method in the present invention. Examples of the method include vapor deposition and thermal spray methods. As the vapor deposition method may be used both a physical vapor deposition method and a chemical vapor deposition method. Examples of the physical deposition method include vacuum deposition, sputtering and ion plating. Examples of the chemical vapor deposition (CVD) method include thermal CVD, plasma CVD and optical CVD. Examples of the thermal spraying method include an atmospheric-pressure plasma thermal spraying method and a low-pressure plasma thermal spraying method. A hard coating film of diamond-like carbon can be formed by the above methods.

(Step (T): Trimming Step)

The step (T) is the step of removing an unnecessary portion of the sheet.

An unnecessary portion of the sheet is preferably removed to form a shape as a part to be attached to the final product. The trimming step is employed when the projection plane having the maximum projection area such as a carport, an arcade, a solar cell cover or a sound isolating board is mainly rectangular and is not always necessary when the size of the sheet matches a required size. The trimming step may be carried out once or divided into two or more substeps such as rough trimming and final trimming. Any one of the step (P), the step (3) and the step (C) may be included in the trimming step. It is preferred from the viewpoint of production efficiency and the expansion of the degree of freedom of hard coating that trimming should be carried out once in conformity to the shape of a part to be attached to the final product after the steps (1) to (3), the step (P) and the step (C).

In the trimming step, conventionally known methods may be used as the method of processing a resin such as cutting, disconnection and punching which may be suitably combined together. As the cutting method may be used a method for cutting with an NC lathe, miller or machining center by using a cutting tool such as a router, end-mill, milling cutter or rotary cutting tool. In the disconnection method, disconnection may be carried out with a blade, abrasive grains, shearing, heating/melting or discharge. Out of these, the cutting method is preferred as cutting devices are widely used and it is excellent in cutting accuracy and speed. Cutting may be complete dry cutting, wet cutting or semi-dry cutting.

As long as the design of the final product is not affected, preferably, edging printing is carried out in conformity to the shape of apart to be attached to the final product, and an outer part of the outer edge is preferably trimmed off. When a hole or a notch is formed on the design surface, a method in which the position of the hole or notch is clearly specified by printing is preferably used.

(Step (A): Attaching Step)

The step (A) is the step of attaching another member to a curved member. The produced member becomes the final member to be attached to the final product preferably by attaching a peripheral member or becomes a product when it is distributable itself. Examples of the peripheral member include a frame, pin, screw, fastener, buffer material, sealing material, hinge and locking mechanism. The peripheral member is fixed by using fixing means such as adhesion, pressure-sensitive adhesion, screwing, welding, mating, ultraviolet welding and laser welding.

(Step (F): Fixing Step)

The step (F) is the step of fixing the obtained curved member to the final product.

A part to which a peripheral member has or has not been attached in the step (A) is fixed to the final product such as a car body by using various fixing means likewise. Adhesion is the most preferred means of fixing the curved member to the final product. A hard adhesive, a semi-hard adhesive and an elastic adhesive may be used in the adhesion method, out of which an elastic adhesive which is excellent as a structure adhesive is preferred, and an urethane-based elastic adhesive is particularly preferred in the present invention. The urethane-based elastic adhesive will be described in detail hereinafter.

The adhesive layer may be formed on any one of the surface of the sheet, the printed layer and the hard coat layer. It may be formed on a layer formed by cutting the formed layer. The surface layer at a position where the adhesive layer is to be formed can be made a predetermined layer without printing by embedding a plate in the formation of the print layer or mainly by masking in the formation of the hard coat layer.

The layer constitution that the member comprises a sheet substrate containing an adhesive, a print layer, a hard coat layer and an adhesive layer will be further described. This layer constitution is typically shown in FIG. 4. The constitutions [1-a] to [1-f] are basically such that the printed layer (43) is formed on the sheet substrate (41), and the hard coat layer (42) is further formed on the print layer (43). [1-a] shows the constitution that the adhesive layer is formed on the hard coat layer. [1-b] shows the constitution that part of the adhesive layer is removed by mechanical processing such as cutting, polishing or blast processing, and the adhesive layer is formed on the sheet substrate. In all the figures, the print layer is entirely removed but portions required for bonding of the printed layer and the hard coat layer should be removed. [1-c] shows the constitution that the upper layer is removed by cutting while the print layer remains. In [1-a] to [1-c], an unshown hard coat layer and an unshown print layer may be formed on the opposite side to the print layer. The hard coat layers on both sides may be the same or different. [1-d] to [1-f] show the constitution that the adhesive layer is formed on the opposite side to the print layer. [1-d] shows the constitution that the adhesive layer is directly formed on the sheet substrate without forming another layer on the adhesive layer side. [1-e] shows the constitution that the hard coat layer is formed on the opposite side to the print layer and there is no hard coat layer on the adhesive layer. As the method of not forming the hard coat layer on the adhesive layer may be used one in which hard coating is carried out on only one side, one in which hard coating is carried out by masking, or one in which the hard coat layer is formed and removed by machining. [1-f] shows the constitution that the adhesive layer is formed on the hard coat layer on the opposite side to the print layer.

The constitutions [2-a] to [2-f] are basically such that the hard coat layer (42) is first formed on the sheet substrate (41) and then the print layer (43) is formed on the hard coat layer. In these constitutions, when these layers are removed up to the sheet substrate, the same constitution as [1-b] is obtained. Even in [2-a], an unshown hard coat layer and an unshown print layer may be formed on the opposite side to the print layer. [2-d] to [2-f] show the constitution that the adhesive layer is formed on the opposite side to the print layer like [1-d] to [1-f].

The constitutions [3-a] to [3-f] show that both the hard coat layer (42) and the print layer (43) have portions formed on the sheet substrate (41) and the adhesive layer is formed on the print layer. To achieve this constitution, a method in which after the print layer is formed, the adhesion portion of the print layer is masked to carry out hard coating, a method in which the print layer portion is masked to carry out hard coating and then the printed layer is formed on the masking removed portion, a method in which hard coating is carried out without masking, the coat is removed in a portion required for bonding and then printing is carried out may be selected. When the print layer is removed up to the sheet substrate even in this constitution, the same constitution as [1-b] is obtained. Even in [3-a], an unshown hard coat layer and an unshown print layer may be formed on the opposite side to the print layer. [3-d] to [3-f] show the constitution that the adhesive layer is formed on the opposite side to the print layer like [1-d] to [1-f].

Out of the above constitutions, [1-a] to [1-f] and [3-a] to [3-f] are preferred because it is preferred to carry out the coating step after the printing step as described above in the present invention. Further, when the hard coat layer adversely affects adhesion performance, the adhesive layer is preferably formed on the sheet substrate or the print layer. Further, the hard coat layer is preferably formed on both sides of the member. From this point of view, [1-b], [1-c], [1-e], [3-a] and [3-e] are more preferred.

(Thermoplastic Resin)

The thermoplastic resin constituting the curved member of the present invention includes a polymer or a copolymer and a resin composition comprising the polymer or the copolymer and additives. The thermoplastic resin in the present invention preferably comprises an amorphous thermoplastic resin as the main component. Even a crystalline thermoplastic resin may be used as the thermoplastic resin of the present invention if it can ensure sufficiently high transparency in injection compression molding. Examples of the crystalline thermoplastic resin include polyethylene naphthalate (PEN) resin and copolyester resin having reduced crystallinity.

Examples of the amorphous thermoplastic resin include polystyrene resin, ABS resin, AES resin, AS resin, methacrylic resin, polycarbonate resin, cyclic polyolefin resin, modified PPE resin, polysulfone resin, polyether sulfone resin, polyarylate resin and polyether imide resin. Out of these, polycarbonate resin is preferred as it has high strength which is required for means of transport, and bisphenol A type polycarbonate is particularly preferred.

Besides the bisphenol A type polycarbonate, various polycarbonate resins polymerized by using another dihydric phenol may be used as the polycarbonate resin. The polycarbonate resin may be manufactured by any manufacturing process, and a terminal capping agent such as a monohydric phenol is used in the case of interfacial polycondensation. The polycarbonate resin may be a branched polycarbonate resin obtained by polymerizing a trifunctional phenol, polyester carbonate resin obtained by copolymerizing an aliphatic dicarboxylic acid and an aromatic dicarboxylic acid, or polycarbonate or copolycarbonate obtained by polymerizing or copolymerizing a divalent aliphatic or alicyclic alcohol. Isosorbide is preferably used as the alicyclic alcohol. Further, the polycarbonate resin may be a copolycarbonate obtained by copolymerizing a unit other than polycarbonate, such as a polyorganosiloxane unit, polyalkylene unit or polyphenylene unit.

When the viscosity average molecular weight of the polycarbonate resin is in the range of 13,000 to 40,000, it can be used in a wide variety of fields. When the viscosity average molecular weight is lower than 20,000, the obtained polycarbonate resin has high cuttability and is suitable for decorative applications and precision carving applications. When the viscosity average molecular weight is 20,000 or more, the obtained polycarbonate resin has excellent strength and is suitable for use in resin windows for means of transport. For use in the resin window of means of transport which is the suitable application of the polycarbonate resin in the present invention, the lower limit of viscosity average molecular weight is more preferably 22,000, much more preferably 23,000. The upper limit of viscosity average molecular weight of the polycarbonate resin is more preferably 35,000, much more preferably 30,000 from the viewpoint of general versatility. The whole polycarbonate resin should have the above viscosity average molecular weight, and a mixture of two or more polycarbonate resins which differ in molecular weight may be used if it satisfies the above range.

The viscosity average molecular weight (M) of the polycarbonate resin is obtained by inserting the specific viscosity ($\eta_{sp}$) of a solution prepared by dissolving 0.7 g of the polycarbonate resin in 100 ml of methylene chloride at 20° C. into the following equation. As for details of the polycarbonate resin, please refer to JP-A 2002-129003.

$$\eta_{sp}/c = [\eta] + 0.45 \times [\eta]^2 c ([\eta] \text{ represents an intrinsic viscosity})$$

$$[\eta] = 1.23 \times 10^{-4} M^{0.83}$$

$$c = 0.7$$

Preferably, the thermoplastic resin typified by the above polycarbonate resin may contain conventionally known various additives as long as the above transparency is not impaired. The additives include a heat stabilizer, antioxidant, ultraviolet absorbent, optical stabilizer, colorant, release agent, sliding agent, infrared absorbent, light diffusing agent, fluorescent brightener, antistatic agent, flame retardant, flame retarding aid, plasticizer, reinforcing filler, impact modifier, optical catalyst antifouling agent, acid inhibiting agent, hydrolysis stabilizer and photochromic agent. The heat stabilizer, antioxidant, ultraviolet absorbent, optical stabilizer, colorant and release agent may be used in conventionally known suitable amounts in the above thermoplastic resin. These amounts rarely impair the transparency of the resin.

Since the curved member of the present invention is suitable for use as a window for means of transport, especially automobiles, it preferably contains a heat stabilizer, an antioxidant, an ultraviolet absorbent and an infrared absorbent in particular.

(Heat Stabilizer)

The heat stabilizer is preferably a phosphorus-based stabilizer. Examples of the phosphorus-based stabilizer include phosphorous acid, phosphoric acid, phosphonous acid, phosphonic acid, esters thereof and tertiary phosphines. Specific examples of the phosphite out of these phosphorus-based stabilizers include (a-1) trialkyl phosphites such as tris(isodecyl)phosphite, (a-2) aryl dialkylphosphites such as phenyl diisodecylphosphite, (a-3) diaryl monoalkylphosphites such as diphenyl mono(isodecyl)phosphite, (a-4) triaryl phosphites such as tris(2,4-di-tert-butylphenyl)phosphite, (b) pentaerythritol phosphites such as distearyl pentaerythritol diphosphite, bis(2,4-di-tert-butylphenyl)pentaerythritol diphosphite, bis(2,6-di-tert-butyl-4-methylphenyl)pentaerythritol diphosphite and bis{2,4-bis(1-methyl-1-phenylethyl)phenyl}pentaerythritol diphosphite and (c) phosphites having a cyclic structure which reacts with a dihydric phenol, such as 2,2-methylenebis(4,6-di-tert-butylphenyl)octyl phosphite. Preferred examples of the phosphate out of the phosphorus stabilizers include trimethyl phosphate and triphenyl phosphate. Preferred examples of the phosphonite compound include tetrakis(2,4-di-tert-butylphenyl)-biphenylene diphosphonite and bis(2,4-di-tert-butylphenyl)-phenyl-phenyl phosphonite. Preferred examples of the tertiary phosphine include triphenyl phosphine.

The antioxidant is preferably a hindered phenol compound. Preferred examples of the hindered phenol compound include tetrakis[methylene-3-(3-tert-butyl-4-hydroxy-5-methylphenyl)propionate]methane, octadecyl-3-(3,5-di-tert-butyl-4-hydroxyphenyl)propionate, and 3,9-bis{2-{3-(3-tert-butyl-4-hydroxy-5-methylphenyl)propionyloxy}-1,1,-dimethylethyl}-2,4,8,10-tetraoxaspiro[5,5]undecane.

Other heat stabilizers include sulfur-containing stabilizers such as pentaerythritol tetrakis(3-mercaptopropionate), pentaerythritol tetrakis(3-laurylthiopropionate) and glycerol-3-stearylthiopropionate, and lactone-based stabilizers.

The amounts of the heat stabilizer and the antioxidant are each 0.0001 to 1 wt %, more preferably 0.01 to 0.3 wt % based on 100 wt % of the thermoplastic resin. The upper limit of the amount of the lactone-based stabilizer is preferably 0.03 wt %.

(Ultraviolet Absorbent)

The ultraviolet absorbent in the present invention is selected from a benzophenone-based compound, benzotriazole-based compound, hydroxyphenyltriazine-based compound, cyclic iminoester-based compound and cyanoacrylate-based compound, all of which are conventionally known as ultraviolet absorbents. Preferred examples of the benzotriazole-based compound include 2-(2H-benzotriazol-2-yl)-p-cresol, 2-(2H-benzotriazol-2-yl)-4-(1,1,3,3-tetramethylbutyl)phenol, 2-(2H-benzotriazol-2-yl)-4,6-bis(1-methyl-1-phenylethyl)phenol, 2-[5-chloro(2H)-benzotriazol-2-yl]-4-methyl-6-tert-butyl phenol and 2,2'-methylenebis[6-(2H-benzotriazol-2-yl)-4-(1,1,3,3-tetramethylbutyl)phenol].

Preferred examples of the hydroxyphenyltriazine-based compound include 2-(4,6-diphenyl-1,3-5-triazin-2-yl)-5-[(hexyl)oxy]phenol. Preferred examples of the cyclic iminoester-based compound include 2,2'-p-phenylenebis(3,1-benzoxazin-4-one). Preferred examples of the cyanoacrylate-based compound include 1,3-bis[(2-cyano-3,3-diphenylacryloyl)oxy]-2,2-bis [[(2-cyano-3,3-diphenylacryloyl)oxy]methyl)propane.

Further, the ultraviolet absorbent may be a polymer type ultraviolet absorbent obtained by copolymerizing an ultraviolet light absorbing monomer having a radically polymerizable monomer compound structure and a monomer such as an alkyl (meth)acrylate. The above ultraviolet light absorbing monomer is preferably a compound having a benzotriazole skeleton, benzophenone skeleton, triazine skeleton, cyclic iminoester skeleton or cyanoacrylate skeleton in the ester substituent of a (meth)acrylic acid ester.

Out of these, cyclic iminoester-based compounds are preferred as the ultraviolet absorbent because they have excellent heat stability. Other compounds having a relatively high molecular weight are also preferred as they have excellent heat resistance. Preferred examples thereof include 2,2'-methylenebis[6-(2H-benzotriazol-2-yl)-4-(1,1,3,3-tetramethylbutyl)phenol], 2-(4,6-diphenyl-1,3,5-triazin-2-yl)-5-[(hexyl)oxy]phenol and 1,3-bis[(2-cyano-3,3-diphenylacryloyl)oxy]-2,2-bis[[(2-cyano-3,3-diphenylacryloyl)oxy]methyl]propane. The content of the ultraviolet absorbent is preferably 0.005 to 5 wt %, more preferably 0.01 to 3 wt %, much more preferably 0.05 to 0.5 wt % based on 100 wt % of the thermoplastic resin.

The thermoplastic resin and the coat layer may also contain a hindered amine-based optical stabilizer typified by bis(2,2,6,6-teramethyl-4-piperidyl)sebacate. A combination of a hindered amine-based optical stabilizer and the above ultraviolet absorbent improves weather resistance effectively. The weight ratio of the optical stabilizer to the ultraviolet absorbent is preferably 95/5 to 5/95, more preferably 80/20 to 20/80. The optical stabilizers may be used alone or in combination of two or more. The content of the optical stabilizer is preferably 0.0005 to 3 wt %, more preferably 0.01 to 2 wt %, much more preferably 0.05 to 0.5 wt % based on 100 wt % of the thermoplastic resin.

(Infrared Absorbent)

The thermoplastic resin of the present invention preferably comprises an infrared absorbent to enhance the efficiency of an air conditioner in buildings and means of transport. Thereby, resin glazing produced by the present invention can achieve an effect due to its lightweight and also the reduction of an environmental load typified by the cutback of carbon dioxide due to the improved efficiency of the air conditioner. Preferred examples of the infrared absorbent of the present invention include inorganic near infrared absorbents such as metal oxides, metal borides and metal nitrides, organic near infrared absorbents such as phthalocyanine-based near infrared absorbents, and carbon fillers.

The inorganic near infrared absorbents have an average particle diameter of preferably 1 to 200 nm, more preferably 2 to 80 nm, much more preferably 3 to 60 nm from the viewpoint of obtaining both transparency and near infrared absorptivity at the same time and dispersibility in the resin. The inorganic material is not particularly limited if it provides the effect of the present invention and is selected from a metal oxide, a metal boride and a metal nitride.

Examples of the metal oxide in the inorganic near infrared absorbent include tungsten oxide-based compounds, titanium oxide, zirconium oxide, tantalum oxide, niobium oxide, zinc oxide, ruthenium oxide, indium oxide, tin-doped indium oxide (ITO), tin oxide, antimony doped tin oxide (ATO) and cesium oxide. The metal boride is preferably a metal polyboride compound, and examples thereof include lanthanum boride ($LaB_6$), praseodymium boride ($PrB_6$), neodymium boride ($NdB_6$), cerium boride ($ceB_6$), yttrium boride ($YB_6$), titanium boride ($TiB_6$), zirconium boride ($ZrB_6$), hafnium boride ($HfB_6$), vanadium boride ($VB_6$), tantalum boride ($TaB_6$), chromium boride ($CrB$, $CrB_6$), molybdenum boride ($MoB6_6$, $Mo_2B_5$, $MoB$) and tungsten boride ($W_2B_5$). Examples of the metal nitride include titanium nitride, niobium nitride, tantalum nitride, zirconium nitride, hafnium nitride and vanadium nitride.

Out of these, tungsten oxide-based compounds are preferred as they have a high near infrared light absorptivity and a high visible light transmittance, and tungsten oxide-based compounds represented by the following general formula ($\alpha$) are particularly preferred.

$$M_xW_yO_z \quad (\alpha)$$

The element M is at least one selected from the group consisting of Cs, Rb, K, Tl, In, Ba, Li, Ca, Sr, Fe and Sn, W represents tungsten, and O represents oxygen. Out of the tungsten oxide-based compounds represented by the above general formula ($\alpha$), cesium-containing tungsten oxide in which the element M is Cs is preferred as it has high near infrared light absorption ability.

In the above general formula ($\alpha$), the amount of the element M added preferably satisfies the relationship $0.001 \leq x/y \leq 1.1$ as the value of $x/y$ based on the content of tungsten. When $x/y$ is around 0.33, the compound exhibits preferred near infrared light absorption ability. When $x/y$ is around 0.33, the compound is apt to take a hexagonal crystal structure and when the compound has this crystal structure, it is preferred in terms of durability. The content of oxygen in the above general formula ($\alpha$) preferably satisfies the relationship $2.2 \leq z/y \leq 3.0$ as the value of $z/y$ based on the content of tungsten. Specific examples of the tungsten oxide-based compound include $Cs_{0.33}WO_3$, $Rb_{0.33}WO_3$, $K_{0.33}WO_3$ and $Ba_{0.33}WO_2$. The above inorganic near infrared absorbents may be used alone or in combination of two or more.

Examples of the carbon filler include carbon black, graphite, carbon nanotube and fullerene, and carbon black is particularly preferred.

The content of the metal oxide-based near infrared absorbent is preferably 10 to 2,000 ppm, more preferably 50 to 1,000 ppm, much more preferably 100 to 700 ppm based on 100 wt % of the thermoplastic resin. The content of the metal boride-based near infrared absorbent is preferably 1 to 200 ppm, more preferably 5 to 100 ppm based on 100 wt % of the thermoplastic resin.

(Production of Molding Resin Material)

The resin material is supplied into an injection compression molding machine in the form of a pellet obtained by melt kneading together necessary additives and the raw material resin. At the time of supplying the resin material, the content of water in the resin material must be reduced completely. A resin material having high water absorptivity such as a polycarbonate resin must be fully dried and supplied into the injection compression molding machine. For melt kneading, a conventionally known melt kneader may be used, and a vented double-screw extruder is particularly preferred. A screen is preferably installed in a zone before the dice of the extruder to remove foreign matter produced during extrusion. When it is necessary to reduce the influence of extraneous dust for pelletization, the atmosphere surrounding the extruder is preferably cleaned. To carry the pellet from the pellet production site to the production site of the injection compression molding machine, dust-proof containers which have been used for pellets for the production of the substrate of an optical information recording medium may be used.

(Printing Ink)

The preferred printing ink of the present invention and other components which can be contained in the printing ink will be described in detail hereinunder.

The preferred printing ink of the present invention is a two-liquid curable ink layer comprising an acrylic polyurethane obtained by reacting an acrylic polyol resin with a polyisocyanate compound. This acrylic polyurethane may be obtained by further copolymerizing a polyol other the acrylic polyol resin.

(Acrylic Polyol Resin)

As the acrylic polyol resin in the printing ink, a copolymer containing a hydroxyl group obtained by polymerizing a monomer containing methyl methacrylate as the main component is preferred because it is excellent in both the heat resistance and weather resistance of the ink. The copolymer is preferably a copolymer of a monomer containing a hydroxyl group and a monomer containing no hydroxyl group and containing methyl methacrylate as the main component because the control of the amount of the hydroxyl group is easy.

Examples of the monomer containing no hydroxyl group except for methyl methacrylate include styrene, $\alpha$-methylstyrene, acrylic acid, methacrylic acid, methyl acrylate, ethyl (meth)acrylate, n-butyl (meth)acrylate, isobutyl (meth)acrylate, tert-butyl (meth)acrylate, 2-ethylhexyl (meth)acrylate, octyl (meth)acrylate, lauryl (meth)acrylate, stearyl (meth)acrylate, isobornyl (meth)acrylate and isopentanyl (meth)acrylate. They may be used alone or in combination of two or more. In this text, the term "(meth)acrylate" means both acrylate and methacrylate, and the term "(meth)acryloxy" means both acryloxy and methacryloxy.

The print layer in the present invention preferably has suitable flexibility. When the print layer has suitable flexibility, it absorbs an expansion difference between it and the base layer so that it can retain high adhesion. Further, since the print layer has excellent follow-up property to bending, it can be easily bent after it is formed. These characteristic properties greatly contribute to excellent adhesion at the time of use at a high temperature or a low temperature after a glazing laminate is finally bonded to a structural member. To provide suitable flexibility, a (meth)acrylate containing the alcohol residue having 4 or more carbon atoms is preferably contained as the monomer other than methyl methacrylate. n-butyl (meth)acrylate and 2-ethylhexyl (meth)acrylate are preferred, and n-butyl (meth)acrylate is particularly preferred.

Examples of the monomer containing a hydroxyl group include (meth)acrylates such as 2-hydroxyethyl (meth)acrylate, hydroxypropyl (meth)acrylate, polyethylene glycol mono(meth)acrylate, polypropylene glycol mono(meth)acrylate, ε-caprolactone adduct of 2-hydroxyethyl (meth)acrylate, β-methyl-γ-valerolactone adduct of 2-hydroxyethyl (meth)acrylate, glycerol mono(meth)acrylate and glycerol di(meth)acrylate, and allyl compounds such as allyl alcohol, glycerol monoallyl ether and glycerol diallyl ether. Out of these, hydroxyalkyl (meth)acrylates are preferred as they are easily acquired and have high reactivity, and 2-hydroxyethyl (meth)acrylate and hydroxypropyl (meth)acrylate are more preferred.

The OH group content of the acrylic polyol resin is preferably 0.5 to 7.4 wt %, more preferably 1 to 5 wt %, much more preferably 1 to 3 wt % based on the total weight. The equivalent of the OH group (molecular weight per OH group) is preferably 230 to 3,400, more preferably 340 to 1,700, much more preferably 570 to 1,700. The content of methyl methacrylate is preferably 25 to 85 wt % based on the total weight of the acrylic polyol resin.

The number average molecular weight of the acrylic polyol resin is preferably 230 to 30,000, more preferably 500 to 10,000, much more preferably 1,000 to 7,000. The number average molecular weight is a value in terms of styrene measured by gel permeation chromatography.

(Polyol Component Other than Acrylic Polyol Resin)

Although the ink layer in the present invention preferably has suitable flexibility as described above, to further enhance flexibility and shape follow-up property, a polyol component other than the acrylic polyol resin is preferably contained in the present invention. Flexibility and shape follow-up property can be enhanced by containing a soft long-chain component which will be described hereinafter to form a crosslinked structure.

The polyol component has two or more hydroxyl groups, preferably 2 or 3 hydroxyl groups in one molecule. The hydroxyl groups may be bonded to any site in the molecule. Preferably, the polyol component has two hydroxyl groups at terminals of the molecule. As the polyol may be used a polyester polyol, polyether polyol, polyether.ester polyol, polycarbonate polyol, polyolefin polyol or silicone polyol. The number average molecular weight of the polyol is 100 to 2,000, preferably 100 to 1,000, more preferably 150 to 600. The polyether polyol is most preferred as it has both heat resistance and flexibility.

The polyether polyol is preferably a polyether polyol obtained by ring-opening polymerizing a cyclic ether or a reaction product of a polyhydric alcohol and a cyclic ether compound. Examples of the polyhydric alcohol include low-molecular weight diols, triols such as trimethylolpropane and glycerin, and polysaccharides having a valence of more than 3 such as xylitol and sorbitol. The low-molecular weight diols include ethylene glycol, propylene glycol, butanediol, pentanediol, neopentyl glycol, 2-ethyl-1,3-hexane glycol, 2,2,4-trimethyl-1,3-pentanediol, 3,3-dimethylol heptane, 1,9-nonanediol, 2-methyl-1,8-octanediol and cyclohexane dimethanol. Preferred examples of the cyclic ether compound include ethylene oxide and propylene oxide.

Specific examples of the polyether polyol include polyethylene glycol, polypropylene glycol and polytetramethylene glycol. Examples of the polyethylene glycol include diethylene glycol which is a dimer, triethylene glycol which is a trimer and pentaethylene glycol which is a pentamer. The polyether polyol is preferably a di- to deca-mer, more preferably a tri- to penta-mer, particularly a trimer.

As the polyester polyol may be used those obtained by polycondensing a dicarboxylic acid or anhydride thereof and a low-molecular weight diol. Examples of the dicarboxylic acid include succinic acid, glutaric acid, adipic acid, pimelic acid, suberic acid, azelaic acid, sebacic acid and phthalic acid. Examples of the low-molecular weight diol include those enumerated for the above polyether polyol. Diethylene glycol and triethylene glycol are also included. Examples of the polyester polyol include polyethylene adipate, polypropylene adipate, polybutylene adipate, polyhexamethylene adipate and polybutylene sebacate. Also, those obtained by ring-opening polymerizing lactone with a low-molecular weight diol, such as polycaprolactone and polymethyl valerolactone, may be used.

Examples of the polyether.ester polyol include those obtained by ring-opening polymerizing a polyester glycol with a cyclic ether, those obtained by polycondensing a polyether glycol and a dicarboxylic acid, such as poly(polytetramethylene ether)adipate.

Examples of the polycarbonate polyol include polybutylene carbonate, polyhexamethylene carbonate and poly(3-methyl-1,5-pentylene)carbonate, all of which are obtained from a low-molecular weight diol and an alkylene carbonate or dialkyl carbonate by deglycolization or dealcoholization.

Examples of the polyolefin polyol include polybutadiene polyol, hydrogenated polybutadiene polyol and polyisoprene polyol, and examples of the silicone polyol include polydimethyl siloxane polyol.

(Polyisocyanate Compound)

The polyisocyanate compound refers to a compound having two or more isocyanate groups. Examples of the diisocyanate compound include:

(1) aromatic diisocyanates such as tolylene diisocyanate (generally abbreviated as "TDI", including 2,4-TDI and 2,6-TDI), diphenylmethane diisocyanate (abbreviated as "MDI", including 4,4'-MDI, 2,4'-MDI and 2,2'-MDI), 1,5-naphthylene diisocyanate, 1,4-naphthylene diisocynate, p-phenylene diisocyanate, m-phenylene diisocyanate, xylylene diisocyanate (abbreviated as "XDI", including o-XDI, m-XDI and p-XDI), tetramethylxylylene diisocyanate (abbreviated as "TMXDI"), 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate and 3,3'-dimethoxydiphenyl-4,4'-diisocyanate;

(2) aliphatic diisocyanates such as tetramethylene diisocyanate, hexamethylene diisocyanate (abbreviated as "HDI"), 2-methyl-1,5-pentane diisocyanate, 3-methyl-1,5-pentane diisocyanate, lysine diisocyanate and trimethylhexamethylene diisocyanate (abbreviated as "TMDI", including 2,2,4-TMDI and 2,4,4-TMDI); and (3) alicyclic diisocyanates such as isophorone diisocyanate (abbreviated as "IPDI"), hydrogenated tolylene diisocyanate, hydrogenated diphenylmethane diisocyanate (abbreviated as "$H_{12}$MDI"), hydrogenated xylylene diisocyanate (abbreviated as "H₆XDI"), hydrogenated tetramethylxylylene diisocyanate and cyclohexyl diisocyanate.

Examples of the triisocyanate compound include triphenylmethane-4,4,4-triisocyanate and tris(p-isocyanatephenyl)thiophosphate.

They may be used alone or in combination of two or more. Out of these, polyisocyanate compounds having no aromatic ring such as aliphatic diisocyanates and alicyclic diisocyanates are preferred from the viewpoint of light resistance required for glazing products, and HDI is particularly preferred.

The polyisocyanate compounds further include modified products of the above polyisocyanate compounds such as urethane modified products, allophanate modified products, urea modified products, biuret modified products, uretdion modified products, uretimine modified products, isocyanurate modified products, adduct modified products and carbodiimide modified products.

Examples of the modified products include adduct modified products of TDI and trimethylolpropane, isocyanurate modified products of TDI, isocyanurate modified products of TDI and HDI, adduct modified products of HDI and trimethylolpropane, uretdion modified products of HDI, biuret modified products of HDI, isocyanurate modified products of HDI, and isocyanurate modified products of IPDI. Out of these, biuret modified products of HDI are preferred. The NCO content of the polyisocyanate compound is preferably 15 to 25 wt % since high reaction efficiency is obtained.

The polyisocyanate compound may be blocked as required. Examples of the blocking agent for the blocked polyisocyanate include alcohols such as methanol, ethanol, propanol, butanol and isobutanol; phenols such as phenol, cresol, xylenol, p-nitrophenol and alkylphenols; activated methylene compounds such as methyl malonate, dimethyl malonate, diethyl malonate, ethyl acetoacetate, methyl acetoacetate and acetyl acetone; acid amides such as acetamide, acrylamide and acetanilide; acid imides such as succinimide and maleimide; imidazoles such as 2-ethyl imidazole and 2-ethyl-4-methyl imidazole; lactams such as 2-pyrrolidone and ε-caprolactam; oximes of a ketone or an aldehyde such as acetoxime, methyl ethyl ketoxime, cyclohexanone oxime and acetoaldoxime; and ethylene imine and bisulfites. The equivalent ratio of the isocyanate group (NCO group) to the hydroxyl group (OH group) is preferably 1/5 to 5/1, more preferably 1/3 to 3/1, much more preferably 1/2 to 2/1, particularly preferably 1/1 to 2/1.

The above acrylic polyol resin component and the polyisocyanate compound and optionally the polyol component other than the acrylic polyol resin are used as they are, preferably dissolved in a solvent to prepare an ink. Preferred examples of the solvent contained in the ink include esters such as butyl acetate, ethyl acetate, 2-methoxypropyl acetate, 3-methoxybutyl acetate, propylene glycol monomethyl ether acetate and butyl diethylene glycol acetate, ketones such as cylohexanone, methyl ethyl ketone and methyl isobutyl ketone, aromatic hydrocarbon-based solvents such as toluene, xylene, solvesso 100 and solvesso 150, and aliphatic hydrocarbon-based solvents such as hexane. In the present invention, the solvent of the ink preferably contains an aromatic hydrocarbon-based solvent, ketone-based solvent or the above ester to prevent the deterioration of a base material such as a polycarbonate more than necessary and obtain high adhesion. A typical example of the two-liquid curable ink which has the above preferred properties is the POS Screen Ink of Teikoku Ink Seizo Co., Ltd.

(Other Components which can be Contained in Ink)

The printing ink may be mixed with additives which are used in this technical field, such as a curing accelerating catalyst, pigment, leveling agent, antifoaming agent, rheology control agent, antioxidant, ultraviolet absorbent, optical stabilizer, functional particles, plasticizer and dispersant before use. Examples of the curing accelerating catalyst include metal salts such as dibutyltin dilaurate, di-n-octyltin dilaurate, tin 2-ethylhexanoate, zinc 2-ethylhexanoate and cobalt salts, and tertiary amines such as triethylamine, pyridine, methylpyridine, benzyl dimethylamine, triethylene diamine, N,N-dimethyl cyclohexylamine, N-methylpiperidine, N-methylmorpholine, pentamethyl diethylenetriamine, 1,4-diazabicyclo[2.2.2]octane and N,N'-dimethylpiperazine. They may be used alone or in combination of two or more. The content of the catalyst is preferably 0.01 to 1 wt % in the case of a metal salt and 0.1 to 5 wt % in the case of a tertiary amine based on 100 wt % of the solids content of the ink.

Various dyes and pigments which are used for printing ink may be used as the pigment, and either an inorganic pigment or an organic pigment may be used. The organic pigment may be a lake pigment or a toner pigment, and aluminum hydroxide, calcium carbonate and titanium oxide may be used as the extender of the lake pigment. Examples of the inorganic pigment include (i) metal oxides such as titanium dioxide (including titanium yellow and titanium black besides a white pigment), zinc oxide, iron oxide, chromium oxide, iron black and cobalt blue, (ii) metal hydroxides such as alumina white, yellow iron oxide and viridian, (iii) chromates such as lead yellow, molybdate orange, zinc chromate and strontium chromate, (iv) silicates such as white carbon, clay, talc and ultramarine blue, (v) sulfates such as precipitation barium sulfate and baryte powder, (vi) carbonates such as calcium carbonate, and (vii) other inorganic pigments such as ferrocyanide (iron blue), phosphate (manganese violet) and carbon (carbon black).

Examples of the organic pigment include basic dyes such as rhodamine lake and methyl violet lake, acid dyes such as quinolone yellow lake, vat dyes such as malachite green lake, mordant dyes such as alizarin lake, azo-based pigments (including soluble azo-based pigments such as carmine 6B and permanent 2B and insoluble azo-based pigments such as diazo-based and monoazo-based pigments), phthalocyanine pigments such as phthalocyanine blue, condensed polycyclic pigments such as thioindigo Bordeaux, perinon red and quinacridone red, fluorescent pigments such as nitro-based pigments, nitroso-based pigments and Rumogen (registered trademark) of BASF AG, and light storing pigments such as Luminova of Nemoto Tokushu Kagaku Co., Ltd. and aniline black.

The curved member having a high-grade design surface of the present invention is used in glazing for vehicles, and a black-out treatment for the shielding and protection of its bonded part is generally carried out in black literally but a color other than black may be used to tint it. In the case of black color, carbon black is preferably used as the main component of a pigment. The oil absorption amount of carbon black is not particularly limited. Carbon black which has high oil absorption and develops a structure is preferred from the viewpoint of shielding but the obtained ink is apt to be sticky. Therefore, the content of carbon black can be controlled in consideration of this.

When the ink in the present invention contains a pigment having a coloring function and a component providing another function, the ink layer can be provided with various functions. The functions include conductive functions (such as heat generation, electromagnetic wave absorption and antistatic functions), water-shedding and oil-shedding functions, hydrophilic function, ultraviolet light absorbing function, infrared light absorbing function, self-curing function and cracking prevention function. For example, after the ink layer for coloring is formed, an ink layer having any one of the above functions is formed on the ink layer or another part. It may be desired that the curved member should be provided with conductive functions, ultraviolet light absorbing function and infrared light absorbing function in particular without greatly impairing transparency. By mixing particles having these functions into the ink layer, these functions can be improved.

The component which is used to obtain the conductive functions is preferably conductive particles such as metal particles. Examples of the conductive particles include fine particles of a metal or an alloy containing an element selected from the group consisting of silver (Ag), palladium (Pd), platinum (Pt), gold (Au), ruthenium (Ru), copper (Cu) and nickel (Ni), or an oxide. These conductive particles may be of a single type, or two or more different types. The average particle diameter of the metal particles is preferably 0.001 to 5 μm, more preferably 0.001 to 2 μm. They are particularly preferably metal nano-particles having an average particle diameter of preferably 0.001 to 0.01 μm. The metal nano-particles are preferred because they can easily form a metal coating film.

As the component which is used to obtain the above ultraviolet light absorbing function may be used various ultraviolet absorbents which will be explained in "Silicone resin-based top layer" hereinafter. Various metal oxides may be preferably used, out of which titanium oxide, zinc oxide and cerium oxide are particularly preferred. As the component which is used to obtain the above infrared light absorbing function may be used various infrared absorbents which are described as the component able to be mixed into the thermoplastic resin.

The dispersoids contained in the ink such as a pigment and functional particles are preferably used in combination with or compounded with a dispersant to enhance their dispersibilities in the ink. As the dispersant may be used a surfactant and a polymer dispersant. Examples of an anionic surfactant as the surfactant include acylmethyl taurine salts, fatty acid salts, alkyl sulfuric acid ester salts, alkylbenzene sulfonic acid salts, alkylnaphthalene sulfonic acid salts, dialkyl sulfosuccinic acid salts, alkyl phosphoric acid ester salts, naphthalene sulfonic acid formalin condensates and polyoxyethylene alkylsulfuric acid ester salts. Examples of a nonionic surfactant as the surfactant include polyoxyethylene alkyl ethers, polyoxyethylene alkyl aryl ethers, polyoxyethylene fatty acid esters, sorbitan fatty acid esters, polyoxyethhylene sorbitan fatty acid esters, polyoxyethylene alkylamines and glycerin fatty acid esters.

Examples of the polymer dispersant include polyvinyl pyrrolidone, polyvinyl alcohol, polyvinyl methyl ether, polyethylene oxide, polyethylene glycol, polypropylene glycol, polyacrylamide, vinyl alcohol-vinyl acetate copolymer, polyvinyl alcohol-partially formalized product, polyvinyl alcohol-partially butyrated product, vinyl pyrrolidone-vinyl acetate copolymer, polyethylene oxide/propylene oxide block copolymer, polyacrylates, polyvinyl sulfates, poly(4-vinylpyridine) salts, polyamides, polyallyl amine salts, condensed naphthalene sulfonates, styrene-acrylate copolymer, styrene-methacrylate copolymer, acrylic acid ester-acrylate copolymer, acrylic acid ester-methacrylate copolymer, methacrylic acid ester-acrylate copolymer, methacrylic acid ester-methacrylate copolymer, styrene-itaconate copolymer, itaconic acid ester-itaconate copolymer, vinyl naphthalene-acrylate copolymer, vinyl naphthalene-methacrylate copolymer, vinyl naphthalene-itaconate copolymer, cellulose derivatives and starch derivatives. Natural polymers such as alginates, gelatin, albumin, casein, gum arabic, tragacanth gum and lignin sulfonate are also included. The above dispersants may be used alone or in combination of two or more.

(Silicone Resin-Based Hard Coat Layer)

A description is subsequently given of a hard coat layer comprising a silicone resin which is one of the preferred hard coating agents in the present invention and an agent forming the layer. As described above, a silicone-resin based hard coat layer comprising a primer layer (first layer) made of an acrylic resin and a silicone resin-based top layer (second layer) is preferred in the present invention.

(Primer Layer)

The primer layer in the above preferred hard coat layer is made of an acrylic copolymer comprising the following units (A-1), (A-3) and (A-4) as essential components, the total content of these three units and the unit (A-2) is at least 70 mol % based on 100 mol % of the total of all the recurring units of the acrylic copolymer, and the units (A-1) to (A-4) satisfy the following requirements. That is, based on 100 mol % of the total of all the recurring units of the acrylic copolymer, i) the total content of the units (A-1) and (A-2) is 40 to 90 mol %;

ii) the content of the unit (A-3) is 1 to 30 mol %;

iii) the content of the unit (A-4) is 5 to 30 mol %; and iv) the content of the unit (A-1) is not less than 30 mol % based on 100 mol % of the total of the units (A-1) and (A-2).

(In the above formula (A-1), $R^1$ is a methyl group or ethyl group.)

(In the above formula (A-2), $R^2$ is a cycloalkyl group, and $X^1$ is a hydrogen atom or methyl group.)

(In the above formula (A-3), $X^2$ is a hydrogen atom or methyl group, and W is an ultraviolet light absorbing group having at least one selected from the group consisting of a triazine structure, benzotriazole structure and benzophenone structure, or an optical stabilizing group having a cyclic hindered amine structure.)

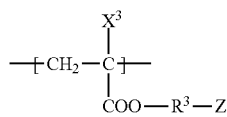
(A-4)

(In the above formula (A-4), $R^3$ is an alkylene group having 2 to 5 carbon atoms, $X^3$ is a hydrogen atom or methyl group, and Z is at least one substituent selected from the group consisting of hydroxyl group, alkoxysilyl group, glycidyloxy group and isocyanate group.)

More preferably, as for the contents of the units (A-1) to (A-4), based on 100 mol % of the total of all the recurring units of the acrylic copolymer, i) the total content of the units (A-1) and (A-2) is preferably 50 to 90 mol %, more preferably 55 to 87 mol %;

ii) the content of the unit (A-3) is preferably 3 to 25 mol %, more preferably 4 to 20 mol %;

iii) the content of the unit (A-4) is preferably 7 to 28 mol %; and iv) the content of the unit (A-1) is preferably not less than 40 mol %, more preferably 40 to 90 mol % based on 100 mol % of the total of the units (A-1) and (A-2).

The monomer inducing the above unit (A-1) is methyl methacrylate or ethyl methacrylate, all of which may be used alone or in combination. The above unit (A-2) is not particularly limited if it is an acrylate or methacrylate having at least one cycloalkyl group in the molecule. The cycloalkyl group preferably has 5 to 12 carbon atoms. Examples of the monomer inducing the unit (A-2) include cyclohexyl (meth)acrylate, 4-methylcyclohexyl (meth)acrylate, 2,4-dimethylcyclohexyl (meth)acrylate, 2,4,6-trimethylcyclohexyl acrylate, 4-t-butylcyclohexyl (meth)acrylate, adamantyl (meth)acrylate, dicyclopentadienyl (meth)acrylate, cyclohexyl methyl (meth)acrylate, 4-methylcyclohexyl methyl (meth)acrylate, 2,4-dimethylcyclohexyl methyl (meth)acrylate, 2,4,6-trimethylcyclohexyl methyl (meth)acrylate and 4-t-butylcyclohexyl methyl (meth)acrylate. They may be used alone or in combination of two or more. Out of these, cyclohexyl methacrylate is most preferably used.

Examples of the monomer inducing a unit containing a benzotriazole structure out of the above units (A-3) include 2-(2'-hydroxy-5'-(meth)acryloxyphenyl)-2H-benzotriazole, 2-(2'-hydroxy-3'-tert-butyl-5'-(meth) acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)phenyl]-5-chloro-2H-benzotriazole and 2-[2'-hydroxy-3'-methyl-5'-(8-(meth)acryloxyoctyl)phenyl]-2H-benzotriazole.

Examples of the monomer inducing a unit containing a benzophenone structure out of the above units (A-3) include 2-hydroxy-4-(2-(meth)acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone and 2-hydroxy-4-(3-(meth)acryloxy-1-hydroxypropoxy)benzophenone.

As the monomer inducing a unit containing a triazine structure out of the above units (A-3), an acrylic monomer represented by the following formula (A-3-i) or (A-3-ii) is preferably used.

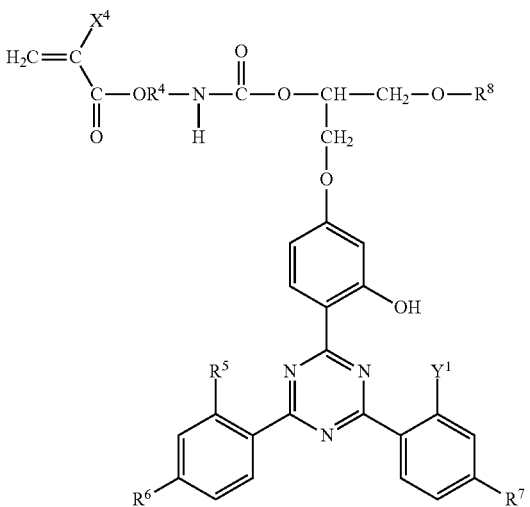
(A-3-i)

(In the above formula (A-3-i), $R^4$ is an alkylene group having 2 to 6 carbon atoms, $R^5$ is a hydrogen atom, alkyl group having 1 to 18 carbon atoms or alkoxy group having 1 to 18 carbon atoms, $R^6$ and $R^7$ are each a hydrogen atom, halogen atom, alkyl group having 1 to 18 carbon atoms, alkoxy group having 1 to 18 carbon atoms or phenyl group which may be substituted by an alkyl group having 1 to 18 carbon atoms or halogen atom, and may be the same or different, $R^8$ is an alkyl group having 1 to 18 carbon atoms, $X^4$ is a hydrogen atom or methyl group, and $Y^1$ is a hydrogen atom, OH group or alkyl group having 1 to 12 carbon atoms.)

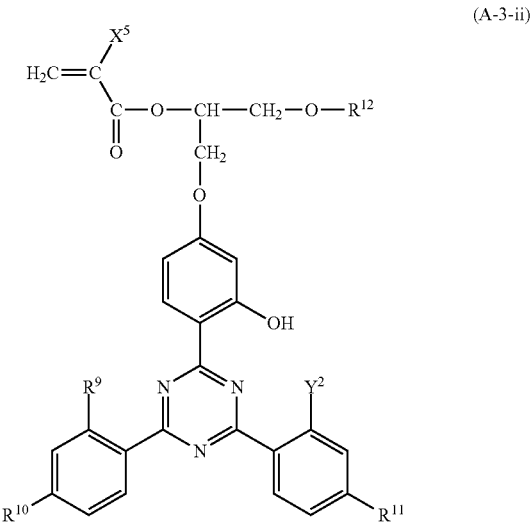
(A-3-ii)

(In the above formula (A-3-ii), $R^9$ is a hydrogen atom, alkyl group having 1 to 18 carbon atoms or alkoxy group having 1 to 18 carbon atoms, $R^{10}$ and $R^{11}$ are each a hydrogen atom, halogen atom, alkyl group having 1 to 18 carbon atoms, alkoxy group having 1 to 18 carbon atoms or phenyl group which may be substituted by an alkyl group having 1 to 18 carbon atoms or halogen atom, and may be the same or different, $R^{12}$ is an alkyl group having 1 to 18 carbon atoms, $X^5$ is a hydrogen atom or methyl group, and $Y^2$ is a hydrogen atom, OH group or alkyl group having 1 to 12 carbon atoms.)

Specific examples of the monomer include 2-(meth)acryloxyethylcarbamide acid 1-[3-hydroxy-4-{4,6-bis(2,4-dimethylphenyl)-1,3,5-triazin-2-yl}phenyloxy]-3-(2-ethylhexyloxy)-2-propyl and 2-(meth)acryloxy-1-[3-hydroxy-4-{4,6-bis(2,4-dimethylphenyl)-1,3,5-triazin-2-yl}phenyloxy]-3-(2-ethylhexyloxy)-2-propane.

Examples of the monomer inducing a unit containing a cyclic hindered amine structure out of the above units (A-3) include 2,2,6,6-tetramethyl-4-piperidyl methacrylate, 1,2,2,6,6-pentamethyl-4-piperidyl methacrylate, 1-ethyl-2,2,6,6-tetramethyl-4-piperidyl methacrylate, 1-propyl-2,2,6,6-tetramethyl-4-piperidyl methacrylate, 1-t-butyl-2,2,6,6-tetramethyl-4-piperidyl methacrylate, 1-cyclohexyl-2,2,6,6-tetramethyl-4-piperidyl methacrylate, 1-(4-methylcyclohexyl)-2,2,6,6-tetramethyl-4-piperidyl methacrylate, 1-t-octyl-2,2,6,6-tetramethyl-4-piperidyl methacrylate, 1-decyl-2,2,6,6-tetramethyl-4-piperidyl methacrylate, 1-dodecyl-2,2,6,6-tetramethyl-4-piperidyl methacrylate, 1-methoxy-2,2,6,6-tetramethyl-4-piperidyl methacrylate, 1-ethoxy-2,2,6,6-tetramethyl-4-piperidyl methacrylate, 1-propoxy-2,2,6,6-tetramethyl-4-piperidyl methacrylate, 1-t-butoxy-2,2,6,6-tetramethyl-4-piperidyl methacrylate, 1-cyclohexyloxy-2,2,6,6-tetramethyl-4-piperidyl methacrylate, 1-(4-methylcyclohexyloxy)-2,2,6,6-tetramethyl-4-piperidyl methacrylate, 1-octoxy-2,2,6,6-tetramethyl-4-piperidyl methacrylate, 1-t-octoxy-2,2,6,6-tetramethyl-4-piperidyl methacrylate, 1-decyloxy-2,2,6,6-tetramethyl-4-piperidyl methacrylate and 1-dodecyloxy-2,2,6,6-tetramethyl-4-piperidyl methacrylate. They may be used alone or in combination of two or more.

Examples of the acrylate or methacrylate monomer having a functional group corresponding to the above formula (A-4) include monomers having a hydroxyl group such as 2-hydroxyethyl (meth)acrylate, 2-hydroxypropyl (meth)acrylate, 3-hydroxypropyl (meth)acrylate, 4-hydroxybutyl (meth)acrylate, 3-hydroxybutyl (meth)acrylate and 2-hydroxybutyl (meth)acrylate, monomers having an alkoxysilyl group such as 3-trimethoxysilylpropyl (meth)acrylate, and monomers having a glycidyloxy group such as 3-glycidoxypropyl (meth)acrylate. They may be used alone or in combination of two or more. Out of these, monomers having a hydroxyl group are preferred, and 2-hydroxyethyl methacrylate is particularly preferred.

The molecular weight of the above acrylic copolymer is preferably not less than 20,000, more preferably not less than 50,000 in terms of weight average molecular weight calculated from GPC measurement in terms of standard polystyrene. An acrylic copolymer having a weight average molecular weight of not more than 10,000,000 is preferably used. Therefore, the weight average molecular weight of the acrylic copolymer is preferably 50,000 to 10,000,000, more preferably 50,000 to 1,000,000, much more preferably 50,000 to 500,000. The acrylic copolymer having a molecular weight within this range is preferred as it fully exhibits performance such as adhesion and strength as the primer layer.

(Other Components Forming Primer Layer)

A blocked polyisocyanate compound is preferably contained in the acrylic resin composition forming the above primer layer. The blocked polyisocyanate compound means a compound obtained by reacting a blocking agent with an isocyanate group to eliminate a free isocyanate group so as to suppress its reactivity at normal temperature and having reactivity as the blocking agent is separated by heating to become an isocyanate group.

Examples of the blocked polyisocyanate compound include blocked polyisocyanate compounds obtained by adding a blocking agent typified by oximes such as acetoxime and methyl ethyl ketoxime, activated methylene compounds such as dimethyl malonate, diethyl malonate, methyl acetoacetate, ethyl acetoacetate and acetyl acetone, alcohols such as methanol, ethanol, 2-propanol, n-butanol, sec-butanol and 2-ethyl-1-hexanol, and phenols such as phenol, cresol and ethyl phenol to the isocyanate group of a polyisocyanate compound.

Examples of the polyisocyanate compound to which the blocking agent is added include polyisocyanates, adduct modified products of a polyisocyanate and a polyhydric alcohol, isocyanurate modified products of polyisocyanates, and isocyanate.biuret products. As the polyisocyanate may be used compounds enumerated in "polyisocyanate compound" in the afore-mentioned "details of printing ink".

These blocked polyisocyanate compounds may be used alone or in combination of two or more. The blocked aliphatic and/or alicyclic polyisocyanate compounds are particularly excellent in weather resistance and preferred. Preferred examples of the blocked aliphatic and/or alicyclic polyisocyanate compounds include (i) adduct type polyisocyanate compounds obtained by blocking an adduct type polyisocyanate compound obtained by reacting a hydroxyl compound having 2 to 4 hydroxyl groups and an aliphatic and/or alicyclic diisocyanate compound(s) with a blocking agent and (ii) isocyanurate type polyisocyanate compounds obtained by blocking an isocyanurate type polyisocyanate compound derived from an aliphatic and/or alicyclic diisocyanate compound(s) with a blocking agent. Aliphatic diisocyanate compounds and/or alicyclic diisocyanate compounds having 4 to 20 carbon atoms are preferred, and aliphatic diisocyanate compounds and/or alicyclic diisocyanate compounds having 4 to 15 carbon atoms are more preferred. When the number of carbon atoms of the isocyanate compound is limited to this range, a coating film having excellent durability is formed.

The blocked polyisocyanate compound has an isocyanate group ratio of preferably 5.5 to 50 wt %, more preferably 6.0 to 40 wt %, much more preferably 6.5 to 30 wt %. The isocyanate group ratio is a percentage of the weight of the formed isocyanate group to the weight of the blocked polyisocyanate compound when the blocked polyisocyanate is heated to separate the blocking agent. When the isocyanate group ratio falls within the above preferred range, adhesion to the base layer and the prevention of cracking of the top layer can be achieved at the same time. The isocyanate group ratio (wt %) is obtained by urinating an isocyanate group with a known amount of an amine and titrating excess amine with an acid. Further, the content of the blocked polyisocyanate compound is such that the content of the isocyanate group is 0.8 to 1.5 equivalents, preferably 0.8 to 1.3 equivalents, most preferably 0.9 to 1.2 equivalents based on 1 equivalent of the reactive group to an isocyanate existent in the above acrylic copolymer. More preferably, Z of the unit (A-4) contains a hydroxyl group unit as the reactive group to an isocyanate and the content of the isocyanate group is 0.8 to 1.5 equivalents, preferably 0.8 to 1.3 equivalents, most preferably 0.9 to 1.2 equivalents based on 1 equivalent of the hydroxyl group.

Further, the acrylic resin composition for forming the above primer layer preferably contains a curing catalyst to promote the dissociation of the blocking agent of the blocked polyisocyanate compound and an urethanation reaction between the regenerated isocyanate group and the hydroxyl group of the acrylic copolymer. Examples of the curing catalyst include organic tin compounds, quaternary ammonium salt compounds, tertiary amine compounds, organic titanium compounds and organic zirconium compounds, and these compounds may be used alone or in combination of two or more. Out of these curing catalysts, organic tin compounds are preferably used. Details of the curing catalyst are described in JP-A 2008-231304.

Further, the acrylic resin composition for forming the primer layer may contain a silane coupling agent, an ultraviolet absorbent and an optical stabilizer. Details of these agents are also described in JP-A 2008-231304. Preferably, the content of the silane coupling agent is 0.2 to 8 wt %, the content of the ultraviolet absorbent is 0.2 to 20 wt %, and the content of the optical stabilizer is 0.05 to 10 wt % based on 100 wt % of the acrylic resin composition. Since the ultraviolet absorbent and the optical stabilizer produce a synergistic effect, when any one of them is not contained in the units (A-1) to (A-4), the other is preferably contained to complement the above. Since ultraviolet absorbents differ in absorption wavelength according to type, different types of ultraviolet absorbents may be contained to complement their effects. As the different types of ultraviolet absorbents may be used organic ultraviolet absorbents and inorganic ultraviolet absorbents. Preferred examples of the inorganic ultraviolet absorbent include a single type of or composite oxide fine particles which are contained in the silicone resin-based top layer as will be described hereinafter, and titanium oxide, cerium oxide and zinc oxide are particularly preferred. When the inorganic ultraviolet absorbent is used, like the dispersant in the printing ink, various dispersants are preferably used to keep the good dispersion of the inorganic ultraviolet absorbent in the hard coat layer. Examples of the dispersant include polymer-based modified polyurethanes, modified polyacrylates, modified polyesters, and polycarboxylic acid-based, phosphoric acid ester-based, alkylene oxide-based and silicone-based dispersants. The polarity of the dispersant may be anionic, cationic or nonionic. An example of the dispersant preferred for the hard coat layer, especially the primer layer of the present invention, is a polymer-based dispersant having an amino group and a molecular weight of 5,000 to 50,000, especially a polymer-based dispersant which is an alkylene oxide modified product of an alkylamine having a molecular weight of 5,000 to 50,000. The polymer-based dispersant may be a block or graft copolymer. Further, after the ultraviolet absorbent is treated with a dispersant, it may be further treated with another dispersant such as a modified polyacrylate. Examples of the modified polyacrylate include (meth)acrylic acid, (meth)acrylic acid alkyl esters and copolymers of another vinyl-based monomer such as styrene which are used as required. The (meth)acrylic acid alkyl esters include (meth)acrylates having an alkyl group with 1 to 35 carbon atoms or a monocyclic saturated alicyclic group, such as cyclohexyl (meth)acrylate, and (meth)acrylates having a saturated alicyclic group with two or more rings such as isobornyl (meth)acrylate. The content of the dispersant is preferably 3 to 80 wt %, more preferably 3 to 30 wt % based on 100 wt % of the total of the above inorganic ultraviolet absorbent and the dispersant.

(Thickness of Primer Layer)

The thickness of the preferred primer layer of the present invention formed by thermally curing the above acrylic resin composition is preferably 1 to 15 µm, more preferably 2 to 10 µm. When the thickness is smaller than 1 µm, the transmittance of ultraviolet light becomes high, whereby the substrate is yellowed or adhesion is lowered with the result of poor weather resistance. When the thickness is larger than 15 µm, a crosslinking reaction does not proceed fully at the time of thermal curing due to the growth of internal stress, thereby obtaining a coating layer having poor durability. Also the volatilization of the solvent used to dissolve the acrylic resin composition becomes unsatisfactory, whereby the solvent remains in the coating film, thereby impairing hot water resistance and weather resistance.

(Method of Forming Primer Layer)

To form the primer layer made of the above acrylic resin composition, the acrylic resin composition is dissolved in a volatile solvent which does not react with and does not dissolve the substrate, this acrylic resin coating composition is applied to the surface of the substrate, the solvent is removed by heating, and the residual product is further heated to react and crosslink a hydroxyl group with an isocyanate group produced by heating so as to form the primer layer. Examples of the solvent include ketones such as acetone, methyl ethyl ketone, methyl isobutyl ketone, diacetone alcohol and cyclohexanone, ethers such as tetrahydrofuran, 1,4-dioxane and 1,2-dimethoxyethane, acetates such as ethyl acetate, butyl acetate, 3-methoxybutyl acetate, diethylene glycol monoethyl ether acetate, propylene glycol monomethyl ether acetate, propylene glycol monoethyl ether acetate and ethoxyethyl acetate, alcohols such as methanol, ethanol, 1-propanol, 2-propanol, 1-butanol, 2-butanol, 2-methyl-1-propanol, 2-methyl-2-propanol, 2-ethoxyethanol, 1-methoxy-2-propanol (propylene glycol monomethyl ether), propylene glycol monoethyl ether, propylene glycol-n-butyl ether and 2-butoxyethanol, hydrocarbons such as n-hexane, n-heptane, isooctane, benzene, toluene, xylene, gasoline, light oil and kerosene, acetonitrile, nitromethane and water. They may be used alone or in combination of two or more. Preferably, the mixing ratio is adjusted to satisfy the above SP value range. In the acrylic resin coating composition, the concentration of the acrylic resin composition (solid content) is preferably 1 to 50 wt %, more preferably 3 to 30 wt %.

The substrate to which the acrylic resin coating composition has been applied is generally dried at normal temperature to a temperature lower than the deformation temperature of the substrate to dry and remove the solvent and then thermally cured. Thermal curing is carried out by heating at a temperature of preferably 80 to 160° C., more preferably 100 to 140° C., most preferably 110 to 130° C. for preferably 10 minutes to 3 hours, more preferably 20 minutes to 2 hours to crosslink a crosslinkable group so as to obtain a molded article having the above acrylic resin layer as the primer layer. When the thermal curing time is shorter than 10 minutes, a crosslinking reaction does not proceed fully, whereby a coating film having poor durability and poor weather resistance in a high-temperature environment may be obtained. A thermal curing time of 3 hours or less suffices from the viewpoint of the performance of the coating film.

(Silicone Resin-Based Top Layer)

The silicone resin-based top layer to be formed on the above primer layer is a coating layer formed by thermally curing an organosiloxane resin composition comprising colloidal silica and a hydrolytic condensate of an alkoxysilane. The top layer is preferably formed by using a coating composition comprising the above organosiloxane resin solid matter comprising colloidal silica and a hydrolytic condensate of an alkoxysilane, an acid, a curing catalyst and a solvent. Examples, amounts and details of the control conditions of the colloidal silica, alkoxysilane, acid, curing catalyst and solvent are also described in JP-A 2008-231304. When more importance is attached to weather resistance, an inorganic ultraviolet absorbent typified by a metal oxide and an organic ultraviolet absorbent are preferably contained. Examples of the inorganic ultraviolet absorbent include titanium oxide, cerium oxide, zinc oxide, tin oxide, zirconium oxide, antimony oxide, tungsten oxide, antimony-containing tin oxide, tin-containing indium oxide, and composite metal oxide fine particles and mixtures thereof. Out of these, titanium oxide, cerium oxide and zinc oxide are preferred, and cerium oxide is particularly preferred.

Other ultraviolet absorbents include metal chelate compounds such as titanium, zinc and zirconium, (partially) hydrolytic condensates thereof, organic compound derivatives having a hydroxybenzophenone-based, benzotriazole-based, cyanoacrylate-based or triazine-based main skeleton, and polymers or copolymers such as a vinyl polymer containing an ultraviolet absorbent in the side chain.

The above silicone resin-based top layer is formed by applying a coating composition obtained by dissolving the above organosiloxane resin composition in a solvent to the primer layer formed on a transparent plastic substrate and thermally curing it. The amount of the solvent is preferably 50 to 1,900 parts by weight, more preferably 150 to 900 parts by weight based on 100 parts by weight of the total of colloidal silica and the hydrolytic condensate of an alkoxysilane. The solids content is preferably 5 to 70 wt %, more preferably 7 to 40 wt %. It is preferred that pH of the organosiloxane resin coating composition should be controlled to preferably 3.0 to 6.0, more preferably 4.0 to 5.5 by adjusting the contents of the acid and the curing catalyst. By controlling pH to this range, the gelation of the organosiloxane resin coating composition at normal temperature can be prevented and the storage stability of the composition can be improved. When the organosiloxane resin coating composition is further aged for several hours to several days, it becomes a stable coating composition.

The thermally cured coating layer (top layer) of the above organosiloxane resin composition is preferably formed successively after the formation of the primer layer. The substrate to which the organosiloxane resin composition has been applied is dried at normal temperature to a temperature lower than the deformation temperature of the substrate to dry and remove the solvent and then thermally cured. Thermal curing is preferably carried out at a high temperature at which there is no problem with the heat resistance of the substrate because curing can be completed quickly. At normal temperature, thermal curing does not proceed and a cured film cannot be obtained. This means that the organosiloxane resin composition contained in the organosiloxane resin coating composition is partially condensed. In the course of thermal curing, the residual Si—OH causes a condensation reaction to form a Si—O—Si bond, thereby forming a coating layer having excellent abrasion resistance. The thermal curing temperature is preferably 50 to 200° C., more preferably 80 to 160° C., much more preferably 100 to 140° C. The thermal curing time is preferably 10 minutes to 4 hours, more preferably 20 minutes to 3 hours, much more preferably 30 minutes to 2 hours.

The thickness of the thermally cured coating layer (top layer) of the organosiloxane resin composition is preferably 2 to 10 µm, more preferably 3 to 8 µm. When the thickness of the coating layer falls within the above range, the coating layer is not cracked by stress produced at the time of thermal curing, or adhesion between the coating layer and the acrylic resin layer (primer layer) does not degrade, and a coating layer having satisfactory abrasion resistance which is the object of the present invention is obtained.

(Primer Layer for Bonding)

Preferably, an adhesive primer is applied in advance to improve the adhesion properties of a urethane adhesive and then the urethane adhesive is applied. A primer comprising a polyisocyanate compound as the main component is preferred on the resin base layer and the print ink layer as the primer for urethane adhesives, and a primer called "body primer" or "primer for coating" may be preferably used. A primer comprising a polyisocyanate compound and a silane compound as the main components is preferred on the hard coat layer, and a primer called "primer for glass" may be preferably used.

The primer for urethane adhesives comprises a solvent, a filler, a catalyst, a desiccant, a resin component and an optional compound in addition to the above main components having reactivity. Even as the polyisocyanate compound in the adhesive primer, compounds enumerated in "polyisocyanate compound" in "details of printing ink" may be used.

In the primer to be applied to the resin base layer and the print ink layer, preferably, the polyisocyanate compound comprises a polyisocyanate having an aromatic ring as the main component. The polyisocyanate compound has excellent reactivity. More preferably, at least one polyisocyanate compound selected from the group consisting of MDI, TDI, triphenylmethane-4,4,4-triisocyanate and tris(p-isocyanate phenyl)thiophosphate is contained in an amount of preferably not less than 50 mol %, more preferably 55 to 90 mol % based on 100 mol % of the polyisocyanate compound contained in the adhesive primer. As another polyisocyanate compound may be used an aliphatic polyisocyanate compound and an alicyclic polyisocyanate compound. Examples of the compounds include isocyanurate modified products of TDI and HDI, adduct modified products of HDI and trimethylol propane, isocyanurate modified products of HDI and isocyanurate modified products of IPDI, out of which isocyanurate modified products of TDI and HDI are particularly preferred as it is easy to control reactivity. The primer to be applied to the resin base layer and the print ink layer is preferably a combination of MDI, tris(p-isocyanate phenyl)thiophosphate and an isocyanurate modified product of TDI and HDI. The content of tris(p-isocyanate phenyl)thiophosphate is preferably set to 50 to 70 mol % based on 100 mol % of the total of the three.

In the primer to be applied to the hard coat layer, a silane coupling agent and a reaction product of a silane compound and a polyisocyanate compound are preferably used as the main components. Although conventionally known silane coupling agents may be used, an epoxy group-containing silane coupling agent such as γ-glycidoxypropyl trimethoxysilane and an amino group-containing silane coupling agent such as N-(β-aminoethyl)-γ-aminopropylmethyl dimethoxysilane are preferably used in combination. A vinyl group-containing silane coupling agent such as vinyl trimethoxysilane is also preferably used as required. As the reaction product of a silane compound and a polyisocyanate compound may be used a reaction product of the above polyisocyanate compound and a mercapto group-containing alkoxysilane compound such as γ-mercaptopropyl trimethoxysilane. Examples of the polyisocyanate compound include aliphatic polyisocyanate compounds typified by HDI, alicyclic polyisocyanate compounds typified by IPDI, and adduct modified products, isocyanurate modified products and biuret modified products thereof.

As the solvent may be used a conventionally known solvent if it is inactive to an isocyanate group. Preferred examples of the solvent include ethyl acetate, butyl acetate, methyl ethyl ketone (MEK), acetone and toluene. Out of these, an acetic acid ester such as ethyl acetate or butyl acetate is preferably contained in an amount of not less than 70 wt %, more specifically not less than 80 wt % based on 100 wt % of the solvent. Further, a saturated hydrocarbon compound having 5 to 12 carbon atoms such as pentane, hexane, heptane, octane, nonane, decane, undecane or dodecane may be used in combination as another component. The content of the saturated hydrocarbon compound having 5 to 12 carbon atoms is preferably 1 to 15 wt % based on 100 wt % of the solvent. The amount of the solvent added is suitably determined according to the type of the isocyanate compound and not particularly limited but generally 500 to 1,000 parts by weight based on 100 parts by weight of the isocyanate component.

Examples of the catalyst for promoting the reaction of the isocyanate group include metal salts such as tin salts and amine-based catalysts enumerated as curing accelerating catalysts in "other components which can be contained in ink". Out of these, dibutyltin dilaurate is preferred as the metal salt and 1,4-diazabicyclo[2.2.2]octane is preferred as the amine-based catalyst. Preferably, the primer composition comprises a tin salt such as dibutyltin dilaurate as an essential component and optionally an amine-based catalyst. The amount of the catalyst added is suitably determined according to the type of the isocyanate compound and not particularly limited but generally 0.1 to 1 part by weight, preferably 0.1 to 0.5 part by weight based on 100 parts by weight of the isocyanate component.

Further, examples of the resin component to be used as a coating film forming component include urethane resins such as polyester polyurethane resin, polyether polyurethane resin and acrylic polyurethane resin, and acrylic resin, epoxy resin and polyester resin. The resin component is preferably contained. The content of the resin component is preferably 3 to 50 wt %, more preferably 5 to 35 wt % based on 100 wt % of the primer composition after curing, that is, solids content.

Further, to ensure the stability of the primer composition, a dehydrating agent which is inactive to an isocyanate group, such as synthetic zeolite, may be used in combination. A filler is preferably contained in the primer composition to improve adhesion, provide a light blocking effect and prevent the shift of a plasticizer contained in the adhesive of a urethane adhesive layer which will be described hereinafter. Examples of the filler include calcium carbonate, silica, carbon black, clay, glass balloon, silica balloon, ceramic balloon, plastic balloon, talc, titanium oxide, calcined lime, zeolite and diatomaceous earth. Carbon black is particularly preferred. The content of the filler is preferably 1 to 60 wt %, more preferably 3 to 55 wt %, much more preferably 5 to 35 wt % based on 100 wt % of the solids content of the adhesive primer. Since carbon black contained in the primer blocks off or absorbs ultraviolet light and visible light, it contributes to the improvement of weather resistance of a glazing member. Carbon black is not particularly limited and examples thereof include N110, N220, N330, N550 and N770 specified in ASTM standards. They may be used alone or in combination of two or more. The primer composition may comprise a phosphoric acid salt such as an aluminum hydrogen salt of a tripolyphosphoric acid to improve adhesion to the substrate.

The primer layer for bonding is formed by applying the primer composition by using various applicators and drying it at normal temperature. Examples of the coating technique include brush coating, spray coating, wire bar coating, blade coating and roll coating. The thickness of the primer layer for bonding is preferably 2 to 40 μm, more preferably 3 to 30 μm, much more preferably 5 to 20 μm.

(Urethane Adhesive)

The urethane adhesive in the present invention may be either a wet curable one-component urethane adhesive or a two-component urethane adhesive. A wet curable one-component urethane adhesive is particularly preferred because it has high production efficiency. The wet curable one-component urethane adhesive generally comprises an isocyanate group-containing compound, especially an isocyanate group-terminated urethane prepolymer (to be referred to as "NCO-terminated prepolymer" hereinafter) as the main component, a plasticizer, a filler, a catalyst and optionally other compounds. The other compounds are used to provide desired properties to the composition and include an adherence agent such as a polyisocyanate compound or a silane coupling agent exemplified by γ-mercaptopropyl trimethoxysilane, a (meth) acrylate-based copolymer for providing heat-resistant adhesion, and a foaming agent and micro-balloon for providing lightweight, damping property and sound insulating property. The content of the prepolymer is selected from a range of preferably 15 to 50 wt %, more preferably 20 to 45 wt %, much more preferably 30 to 45 wt % based on the total amount of the urethane adhesive composition. Preferred typical examples of the urethane adhesive composition include adhesives for direct glazing such as WS-222 of The Yokohama Rubber Co., Ltd. and #560 of Sunstar Inc.

The isocyanate group-terminated urethane prepolymer is preferably used as the main component of the above wet curable one-component urethane adhesive and can be produced by reacting an excessive amount of a polyisocyanate compound with a polyol in accordance with a commonly used method. Examples of the polyol include polyether polyols, polyester polyols, polyols comprising a C—C bond as the main chain, low-molecular weight polyols and other polyols. The number average molecular weight of the urethane prepolymer is preferably 1,000 to 30,000, more preferably 2,000 to 10,000. The weight ratio of the polyol to the polyisocyanate compound used to produce the isocyanate group-terminated urethane prepolymer is preferably 1.2 to 4 in terms of the ratio of the NCO group to the OH group (NCO group/OH group (equivalent ratio)). The lower limit of the above range is more preferably 1.5 and the upper limit of the above range is more preferably 2.5, much more preferably 2.2.

The polyether polyols include polyols obtained by adding an alkylene oxide such as ethylene oxide, propylene oxide, butylene oxide or polyoxytetramethylene oxide to a polyhydric alcohol such as ethylene glycol, diethylene glycol, propylene glycol, dipropylene glycol, glycerin, 1,1,1-trimethylolpropane, 1,2,5-hexanetriol, 1,3-butanediol, 1,4-butanediol or pentaerythritol. When a polyol having 3 or more functional groups obtained by adding an alkylene oxide to a polyhydric alcohol having 3 or more hydroxyl groups such as glycerin, 1,1,1-trimethylolpropane or pentaerythritol is contained, the obtained adhesive has high strength and can be easily produced from general-purpose raw materials. As the polyol having 3 or more functional groups, a polyoxyalkylene triol such as polyoxypropylene triol is particularly preferred as it is inexpensive and excellent in the strength of the adhesive. It is preferred to use the polyol having 3 or more functional groups in combination with a bifunctional polyol such as polypropylene glycol or polytetramethylene glycol because it is easy to control strength required for the adhesive. As for the ratio of the polyol having 3 or more functional groups to the bifunctional polyol, the content of the trifunctional polyol is preferably 30 to 80 wt %, more preferably 50 to 70 wt % based on 100 wt % of the total of these. The ratio is the same in the case of any polyol.

The polyester polyols include condensation polyester polyols, lactone-based polyester polyols and polycarbonate diols. The polyols comprising a C—C bond as the main chain include acrylic polyols, polybutadiene-based polyols, hydrogenated polybutadiene-based polyols, polyolefin-based polyols and saponified ethylene-vinyl acetate copolymers. The low-molecular weight polyols include ethylene glycol, diethylene glycol, propylene glycol, dipropylene glycol, butanediol, pentanediol and hexanediol. The other polyols include polyols for flame retardation, phosphorus-containing polyols and halogen-containing polyols.

The polyols used in the above isocyanate group-terminated urethane prepolymer may be used alone or in combination of two or more. Out of the above polyols, polypropylene glycols are particularly preferred, and two or more different polypropylene glycols which differ in molecular weight may be used in combination.

As the isocyanate compound used in the isocyanate group-terminated urethane prepolymer may be used compounds enumerated in "polyisocyanate compound" in the afore-mentioned "details of printing ink", out of which compounds comprising a polyisocyanate having an aromatic ring as the main component are more preferred, MDI and TDI are much more preferred, and MDI is particularly preferred from the viewpoints of strength and general versatility. The isocyanate compounds may be used alone or in combination of two or more, and the terminal structure may be a biuret modified product.

Other essential components in the urethane adhesive include a plasticizer, a filler and a catalyst.

Examples of the plasticizer include diisononyl phthalate, dioctyl phthalate (DOP), dibutyl phthalate, dilauryl phthalate, butylbenzyl phthalate, dioctyl adipate, diisodecyl adipate, trioctyl phosphate, tris(chloroethyl)phosphate, tris (dichloropropyl)phosphate, adipic acid propylene glycol polyester, adipic acid butylene glycol polyester, alkyl epoxystearate, alkyl benzene and epoxylated soybean oil. The content of the plasticizer is preferably 10 to 30 wt %, more preferably 15 to 25 wt % based on the total weight of the urethane adhesive composition.

Examples of the filler include calcium carbonate, silica, carbon black, clay, glass balloon, silica balloon, ceramic balloon, plastic balloon, talc, titanium oxide, calcined lime, zeolite and diatomaceous earth. A combination of carbon black and another filler is preferred, and this filler is particularly preferably a clay such as kaolin or montmorillonite, or calcium carbonate. The content of the filler is preferably 30 to 65 wt %, more preferably 40 to 60 wt %, much more preferably 40 to 50 wt % based on the total weight of the urethane adhesive composition. The content of carbon black may be selected from a range of preferably 10 to 40 wt %, more preferably 25 to 35 wt % based on the total weight of the urethane adhesive composition.

Examples of the catalyst include organic tin compounds (such as dibutyltin diacetyl acetonate, dibutyltin dilaurate, tin octylate and dibutyltin dimaleate); 2,2'-dimorpholinodiethyl ether and di(2,6-dimethylmorphpolinoethyl)ether; bismuth carboxylates (such as bismuth 2-ethylhexanoate, bismuth octylate and bismuth neodecanoate); carboxylic acids (such as benzoic acid, phthalic acid, 2-ethylhexanoic acid, octylic acid, stearic acid, oleic acid and linoleic acid); triethylenediamine and salts thereof; bis(2-dimethylaminoethyl)ether; 1,8-diazabicyclo(5,4,0)undecene-7 and salts thereof (such as phenol salts, octylates, oleates, p-toluenesulfonates, formates); and imidazole-based compounds (such as 2-methylimidazole, 2-undecylimidazole, 2-heptadecylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazol isocyanuric acid adduct, 2-methylimidazole isocyanuric acid adduct, 2-phenyl-4,5-dihydroxymethylimidazole, 2-phenyl-4-methyl-5-hydroxymethylimidazole, 2-phenylimidazoline and 2,3-dihydro-1H-pyro[1,2-a]benzimidazole). The content of the catalyst may be selected from a range of 0.005 to 0.5 wt % based on the total weight of urethane adhesive composition.

Further, an adherence agent [the above polyisocyanate compound having a molecular weight of less than 1,000, a silane coupling agent (such as mercaptopropyl trimethoxysilane, mercaptopropylmethyl dimethoxysilane, γ-N-phenylaminopropyl trimethoxysilane or γ-isocyanatopropyl trimethoxysilane), or a reaction product of the polyisocyanate compound and the silane coupling agent]; a hexamethylene diisocyanate derivative (such as biuret modified product, isocyanurate modified product or trimethylolpropane modified product); a titanate-based coupling agent; a solvent (such as xylene or toluene); and an anti-aging agent, an antioxidant, a foaming agent, an ultraviolet absorbent and a pigment may be added in suitable amounts as required.

The thickness of the urethane adhesive layer in the present invention is preferably determined from the range specified in "Plastic/Steel" in FIG. 27 at page 385 of "Adhesives and Sealants: General Knowledge, Application Techniques, New Curing Techniques (Elsevier Science Ltd., 2006). Since the range is set on a relative safe side in the figure, the thickness of the urethane adhesive layer may be made small within a range less than 2 mm, preferably less than 1.5 mm from the line demarcating the range in consideration of shapes and use conditions. Particularly when the length of a molded article is less than 1 m, it is possible to design a thickness on a line extrapolating a line satisfying $\Delta\alpha=12\times10^{-6}K$.

EXAMPLES

The mode of the present invention which the inventors of the present invention think is the best is the unification of the preferred ranges of the above requirements, and typical examples thereof are described in the following Examples. As a matter of course, the present invention is not limited to these.

(I) Evaluation Items (I-1) Visual Evaluation of Appearance

The appearances of sheets produced by injection compression molding (expressed as "before" in Tables 1 and 2, the same as in (I-2) below) and sheets after thermoforming (expressed as "after" in Tables 1 and 2, the same as in the (I-2) below) were checked based on heterogeneity in perspective images and reflection images observed through the molded articles. The evaluation criteria are A to D below. The results are shown in Tables 1 and 2.

A: Even when the sheet is observed at an acute angle of about 10 to 20° from the surface, no defect is seen.

B: When the sheet is observed at an acute angle of about 10 to 20° from the surface, a slight defect is seen. For example, a defect cannot be easily recognized by a person except for a person in charge even when it is pointed out. Alternatively, a weak shadow can be confirmed from a projection image of the defect by direct sunlight during a fine day.

C: When the sheet is observed at an acute angle of about 10 to 20° from the surface, a defect is recognized. For example, a person except for a person in charge can recognize a defect if it is pointed out. Alternatively, a relatively dark shadow can be confirmed from a projection image of the defect by direct sunlight during a fine day.

D: Even when the sheet is observed at a relatively gentle angle of about 30° or more from the surface, a defect is recognized. For example, a person having no preconceived idea except for a person in charge can recognize a defect when he/she observes the sheet without being point out. Alternatively, a dark shadow can be confirmed from a projection image of the defect by direct sunlight during a fine day.
(The darkness of the shadow of the above projection image indicates a relative degree when samples which differ in appearance state are compared with one another under the same conditions.)

(I-2) Evaluation of Surface States of Sheets Produced by Injection Compression Molding and Sheets after Thermoforming The surfaces of the sheets produced by injection compression molding and the sheets after thermoforming were measured as follows. That is, arbitrary three sites on each side (6 in total on both sides) of each sheet were measured by using a surface roughness measuring instrument (Surfcom 1400A of Tokyo Seimitsu Co., Ltd.) in accordance with JIS B0610 to calculate the surface roughness Ra. Further, the waviness amplitude Wa and waviness wavelength WSm of a filtered waviness curve in the above expression (1) were also calculated by extracting the filtered waviness curve by means of the above measuring instrument based on the conditions that the standard length L was 90 mm, the cut-off wavelength obtained from the surface unevenness was 2.5 mm, the cut-off type was 2CR (phase non-compensation) and slope compensation was minimum square curve compensation. Arbitrary 3 sites on each side (6 sites in total on both sides) of the sheet were measured to obtain Wa and WSm likewise. The results are shown in Table 1.

(II) Production of Resin Material

(II-1) Production of Resin Material A1

The process of manufacturing the resin material A1 will be described based on the following symbols for the raw materials. 9.5 parts by weight of PC, 0.08 part by weight of VPG, 0.02 part by weight of SA, 0.03 part by weight of PEPQ, 0.05 part by weight of IRGN, 0.32 part by weight of UV1577 and $1\times10^{-4}$ part by weight of BL were uniformly mixed together by means of a super-mixer. 10.0001 parts by weight of the obtained mixture and 90 parts by weight of PC were uniformly mixed together by means of a twin-cylinder mixer to obtain a pre-mixture to be supplied into an extruder.

The obtained pre-mixture was supplied into the extruder. The extruder in use was a vented double-screw extruder having a screw diameter of 77 mm (TEX77CHT (completely interlocking, unidirectional rotation, two screws) of The Japan Steel Works, Ltd.). The extruder had a kneading zone provided with a combination of a forward feed kneading disk and a back feed kneading disk in a portion having an L/D of about 8 to 11 and a kneading zone provided with a feed kneading disk in a portion having an L/D of about 16 to 17 when seen from the root of the screw. Further, the extruder had a back feed full-flight zone with an L/D of 0.5 right after the latter kneading zone. One vent port was formed in a portion having an L/D of about 18.5 to 20. Extrusion conditions included a discharge rate of 320 kg/h, a screw revolution of 160 rpm and a vent vacuum degree of 3 kPa. The extrusion temperature was gradually raised from 230° C. at a first feed port to 280° C. at a die portion.

A strand extruded from the die was cooled in a warm water bath and cut by a pelletizer to obtain pellets. When the pellets right after cutting passed through a vibration type sieve in 10 seconds, a long pellet which was not completely cut and a cut chip which could be removed were removed.

(II-2) Production of Resin Material A2

9.43 parts by weight of PC, 0.1 part by weight of VPG, 0.02 part by weight of SA, 0.03 part by weight of PEPQ, 0.05 part by weight of IRGN, 0.3 part by weight of UV1577, 0.07 part by weight of IRA and $1\times10^{-4}$ part by weight of BL were uniformly mixed together by means of a super-mixer. A pellet-like resin material A2 was obtained in the same manner as the production of the resin material A1 except that 10.0001 parts by weight of the obtained mixture and 90 parts by weight of PC were uniformly mixed together by means of a twin-cylinder mixer to obtain a pre-mixture to be supplied into an extruder.

The above raw materials in use are as follows.
PC: polycarbonate resin powder having a viscosity average molecular weight of 25,000 and manufactured from bisphenol A and phosgene by interfacial polycondensation (Panlite L-1250WQ (trade name) of Teijin Chemicals Ltd.)
VPG: full ester of pentaerythritol and an aliphatic carboxylic acid (comprising stearic acid and palmitic acid as the main components) (Loxiol VPG861 of Cognis Japan Co., Ltd.)
SA: fatty acid partial ester (Rikemal S-100A of Riken Vitamin Co., Ltd.)
PEPQ: phosphonite-based heat stabilizer (Sandostab P-EPQ of Sandoz AG)
IRGN: hindered phenol-based antioxidant (Irganox 1076 of Ciba Specialty Chemicals Co., Ltd.)
UV1577: 2-(4,6-diphenyl-1,3,5-triazin-2-yl)-5-[(hexyl)oxy] phenol (Tinuvin1577 of Ciba Specialty Chemicals Co., Ltd.)
BL: bluing agent (Macrolex Violet B of Bayer AG)
IRA: infrared screening agent comprising an organic dispersed resin and $Cs_{0.33}WO_3$ (average particle diameter of 5 nm) as an inorganic infrared absorbent and having an inorganic infrared absorbent content of about 23 wt % (YMDS-874 of Sumitomo Metal Mining Co., Ltd.)

(III) Production of Gray Sheet Molded Article

(III-1) Production of Sheet-α

Figure 5:
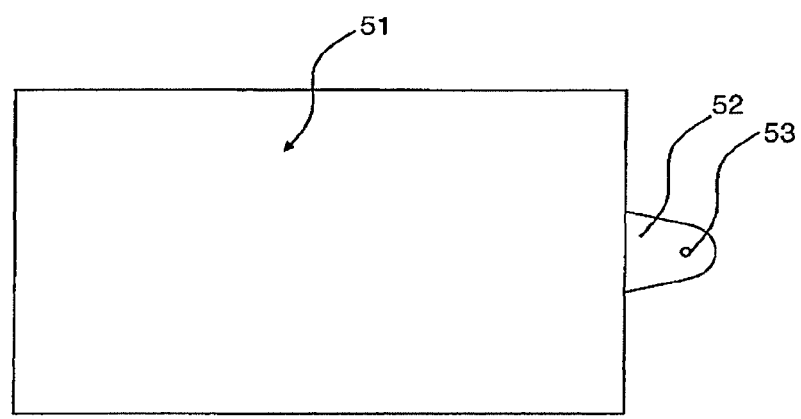
FIG. 5 is a diagram showing the shape of sheet-α formed in Example.

A pellet of the above resin material A1 or A2 was injection press molded by using a large-sized molding machine having the four-axis parallelism control mechanism of a platen and capable of injection press molding (MDIP2100 of Meiki Co., Ltd., maximum mold clamping force of 33540 kN) to produce a sheet molded article having a thickness of 4.5 mm, a length of 1,000 mm and a width of 600 mm shown in FIG. 5. As shown in the figure, molding was carried out with one hot runner (53) and a gate (52). A mold had the same level of surface state on both front and rear sides.

This molding machine had a hopper drier capable of drying the resin raw material completely, and the pellet after drying was supplied into the feed port of the molding machine by pressure to be molded. Molding was carried out at a cylinder temperature of 300° C., a hot runner set temperature of 300° C., a mold temperature of 110° C. on both fixed side and movable side, a press stroke of 1.5 mm, a pressure holding time of 120 seconds, a pressure of 17 MPa and an overlap time of 0.12 sec, and the parting surface of the movable mold should not come into contact with the parting surface of the fixed mold at the final advance position. Right after the end of filling, a valve gate was closed to prevent the molten resin from flowing back into the cylinder from the gate. In all of mold compression and mold opening steps during molding, parallelism between molds was kept at a tan θ which indicates the amount of inclination and the amount of twisting of about 0.000025 or less by the four-axis parallelism control mechanisms.

(III-2) Production of Sheet-β

Figure 6:
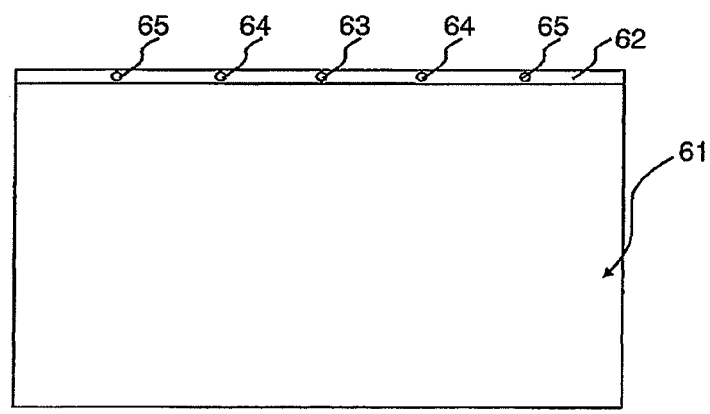
FIG. 6 is a diagram showing the shape of sheet-β formed in Example.

As shown in FIG. 6, molding was carried out in the same manner as the above sheet-α except that a mold having a gate (62) with 5 hot runners (63 to 65) on the long side was used. Cascade molding was carried out by a SVG method in the order of a first hot runner gate (64), second hot runner gates and third hot runner gates (63) to produce a sheet without a welded part.

(III-3) Production of Sheet-γ (for Comparison)

After the resin material A1 or A2 was dried with hot air at 120° C. for 5 hours, an extruded sheet having a thickness of 4.5 mm and a width of 1,200 mm was produced by the extrusion method described in JP-A 2005-081757, 100 mm both end portions were cut off to produce a sheet having a long side length of 1,000 mm, and the sheet was cut to a length of 600 mm in the extrusion direction so as to obtain a sheet molded article having a thickness of 4.5 mm, a length of 1,000 mm and a width of 600 mm.

(IV) Printing on Sheet

Figure 7:
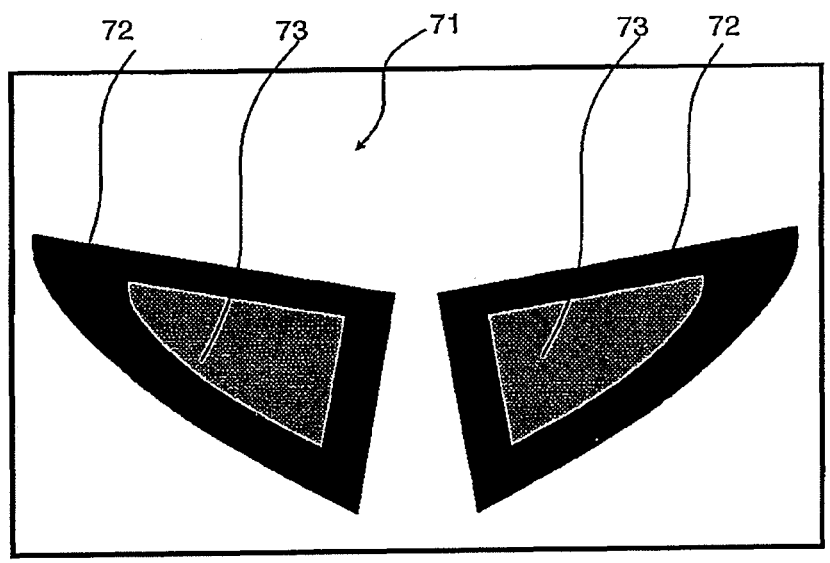
FIG. 7 is a schematic diagram of a sheet after printing (the gate portion is not shown)

As shown in FIG. 7, two window frame patterns were screen printed on the sheet obtained in (III) above with a black ink having a light screening function. Printing was carried out by circulating clean air in a 23° C. −50 RH % atmosphere. A 200-mesh screen plate was used, and the thickness of the obtained print layer was about 8 μm. In the case of two or three coating layers, the first layer was printed and dried with air in the above atmosphere for 90 minutes and then the next layer was printed. The thickness of the print layer increased almost in proportion to the number of layers. For example, when three coating layers were formed, a total thickness of about 24 μm was obtained. Printing was carried out in such a manner that an ink was placed by screen printing, dried with air in the above atmosphere for 30 minutes and then treated at 90° C. for 60 minutes to dry and fix an ink layer. In the case of multiple coating layers, after final printing, the above treatment was carried out. The ink used for printing was as follows (only the types of inks are shown below but all the inks are black inks).

TAS: two-pack ink containing an urethane resin comprising a polyester polyol and a polyisocyanate as a binder (a homogeneous mixture of 100 parts by weight of the TAS screen ink, 5 parts by weight of the 210 curing agent and 15 parts by weight of the G-002 solvent (all the raw materials were manufactured by Teikoku Printing Inks Mfg. Co.) was used as an ink)

MRX: two-pack ink containing an urethane resin comprising a polyester polyol and a polyisocyanate as a binder (a homogeneous mixture of 100 parts by weight of the MRX screen ink, 5 parts by weight of the 210 curing agent and 15 parts by weight of the G-002 solvent (all the raw materials were manufactured by Teikoku Printing Inks Mfg. Co.) was used as an ink)

POS: two-pack ink containing an urethane resin comprising an acrylic polyol and a polyisocyanate as a binder (a homogeneous mixture of 100 parts by weight of the POS screen ink, 5 parts by weight of the 210 curing agent and 15 parts by weight of the P-002 solvent (all the raw materials were manufactured by Teikoku Printing Inks Mfg. Co.) was used as an ink)

VK: one-pack ink containing a vinyl chloride-vinyl acetate copolymer resin as a binder (a combination of 100 parts of the VK screen ink and 15 parts by weight of the J-002 solvent (all the raw materials were manufactured by Teikoku Printing Inks Mfg. Co.) was used as an ink)

ISX: polyester-based one-pack ink (a combination of 100 parts by weight of the ISX screen ink and 10 parts by weight of the Z-705 solvent (all the raw materials were manufactured by Teikoku Printing Inks Mfg. Co.) was used as an ink)

(V) Thermoforming of Sheet

After the end of the above printing, a thermal press molding machine was used to bond a cotton flannel to both sides of a wooden female mold and both sides of a wooden male mold by an adhesive. After thermoforming, two cotton flannels were placed one upon the other on a 5 mm or more outer portion from the outer edge of the above printing frame so that pressure from the mold could be buffered on an inner portion from the printing frame. Each cotton flannel had a thickness of 0.5 mm. After the sheet was attached to a clamp at an accurate position by using a jig, it was supplied into an air forced circulation heating furnace having an inside temperature of 170° C. by a conveyer device. The sheet remained in the heating furnace for 10 minutes to be preheated (step (2)).

Thereafter, the sheet was supplied to a thermal press molding step immediately by a continuous conveyer device and press molded while it was sandwiched between the above molds (step (3)). After it remained in the cavity between the molds for 2 minutes, it was taken out from the molds by the conveyer device and removed from the clamp to obtain a sheet having a curved surface. The curved surface had a curvature radius of about 2,500 mm in a product portion.

Figure 8:
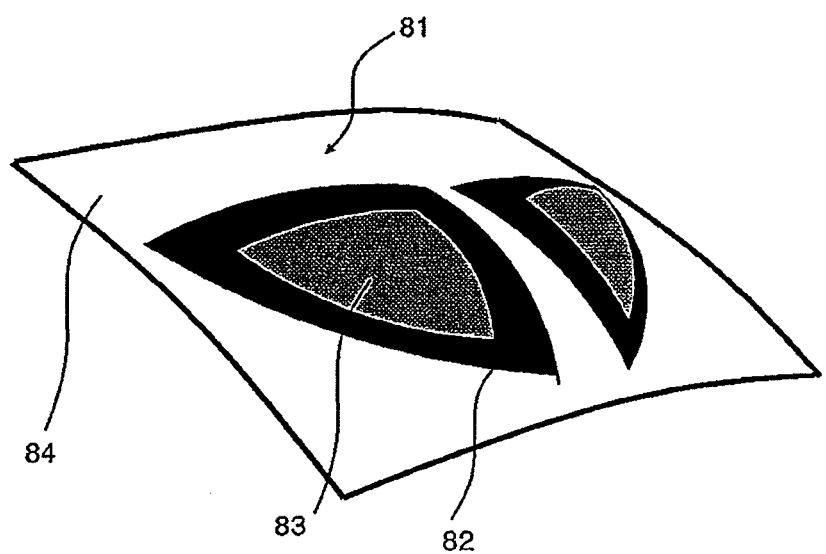
FIG. 8 is a schematic diagram of a sheet after thermoforming (the gate portion is not shown)

The positioning of the sheet in the molds was carried out by inputting the attachment position of the sheet to the clamp and the positions of the molds into the program of the conveyer device accurately in advance. A printed molded article which was free from a shift in the printing position or a defect in the printed portion of the thermoformed product was obtained due to the low and uniform heat shrinkage or expansion characteristics and the control of positioning of the sheet produced by injection press molding. The above thermal press molding was carried out in a normal temperature atmosphere while clean air was circulated, and the wooden molds were used without controlling their temperatures. A masking film was used to protect the both sides of the sheet to be stored until it was supplied to the subsequent step. FIG. 8 is a diagram of the sheet after thermoforming.

(VI) Evaluation of Thermoformed Sheet

Examples 1 to 10 and Comparative Examples 1 and 2

The sheets before and after the above thermoforming were evaluated based on the above evaluation methods (I-1) and (I-2). The results are shown in Tables 1 and 2.

TABLE 1

| | Resin material | Gray sheet | Printing Ink | Number of times | Thermoformed sheet sample name | Appearance rating Before | After | Ra (μm) Before | After | Wa (μm) Before | After | Wsm (mm) Before | After |
|---|---|---|---|---|---|---|---|---|---|---|---|---|---|
| Ex. 1 | A1 | Sheet-α | POS | 1 | PTF-1 | A | A | 0.02 | 0.02 | 0.02 | 0.022 | ※1 | 10 |
| Ex. 2 | A1 | Sheet-β | POS | 1 | PTF-2 | A | B | 0.02 | 0.02 | 0.023 | 0.025 | ※1 | 10 |
| C. Ex. 1 | A1 | Sheet-γ | POS | 1 | PTF-3 | C | D | — | — | — | — | — | — |
| Ex. 3 | A2 | Sheet-α | POS | 1 | PTF-4 | A | A | 0.025 | 0.025 | 0.025 | 0.028 | ※1 | 10 |
| C. Ex. 2 | A2 | Sheet-γ | POS | 1 | PTF-5 | C | D | — | — | — | — | — | — |

Ex.: Example
C. Ex.: Comparative Example
※1 The average wavelength of surface waviness is not detected.

TABLE 2

| | Resin material | Gray sheet | First printing Ink | Second printing Ink | Third printing Ink | Thermoformed sheet sample name | Appearance rating Before | After |
|---|---|---|---|---|---|---|---|---|
| Example 4 | A1 | Sheet-α | POS | POS | POS | PTF-6 | A | A |
| Example 5 | A1 | Sheet-β | POS | POS | POS | PTF-7 | A | B |
| Example 6 | A2 | Sheet-α | POS | POS | POS | PTF-8 | A | A |
| Example 7 | A1 | Sheet-β | TAS | — | — | PTF-9 | A | B |
| Example 8 | A1 | Sheet-α | MRX | — | — | PTF-10 | A | A |
| Example 9 | A2 | Sheet-α | VK | — | — | PTF-11 | A | A |
| Example 10 | A2 | Sheet-α | POS | ISX | — | PTF-12 | A | A |

As obvious from Table 1, a poor appearance of the extruded sheet before thermoforming is slightly recognized. However, when the sheet is heated at a temperature higher than the glass transition temperature to be fully softened and has a heat history that it is applied by deformation stress, a latent defect becomes obvious and even a person who is not experienced can recognize the defect relatively easily. The above defect is not recognized in a sheet formed by injection press molding even after thermoforming or can be easily recognized only by a skilled person. Due to this effect, an unconventional molded article having a high-grade curved surface can be provided at a low cost in the present invention.

To check if the above relationship (1) was satisfied or not, some of the samples were measured for Ra, Wa and Wsm. They satisfied the relationship (1) without great reductions in Ra, Wa and Wsm before and after thermoforming.

(VII) Hard Coating of Sheet

The following hard coating was made on some of the sheets which had been thermoformed as described above, and each of the hard coated sheets was attached to a SUS frame by using an adhesive so as to evaluate its adhesion based on the assumption that it was finally attached to a car body. As for those whose entire surface was to be hard coated out of the above thermoformed products, the masking film was removed and the surface of the sheet was cleaned by using a BEMCOT wiper impregnated with isopropyl alcohol. As for those which were masked to prevent the printed portion from becoming wet with a hard coating solution, only that portion was subjected to a new heat-resistant masking treatment to clean the surface to be coated with the hard coating solution.

Each of the following acrylic resin coating compositions for the first layer was applied to both sides of the thermoformed product whose surface had been cleaned by a flow coating technique to ensure that a liquid pool was not formed and left in a clean room at 25° C. and a relative humidity of 50% for 20 minutes to be dried with air. Thereafter, HP-1 and HP-2 out of the following acrylic resin coating compositions for the first layer were kept in an air forced circulation heating furnace at an inside temperature of 125° C. for 60 minutes and HP-3 at 135° C. for 30 minutes to be thermally cured so as to form cured films having an average thickness of about 8 μm at a central transparent portion. An organosiloxane resin coating composition for the second layer was applied to both sides of the cured film and left in the same manner as the first layer, HP-1 and HP-2 were kept in an air forced circulation heating furnace at an inside temperature of 125° C. and HP-3 at 135° C. for 60 minutes to be thermally cured so as to form cured films having an average thickness of about 4 μm at a central transparent portion.

Flow coating was carried out from a single nozzle, and the coating composition was let flow from an end portion on the long side of the thermoformed sheet to produce a liquid flow from the non-design surface toward the design surface. The acrylic resin coating composition and the organosiloxane resin coating composition over the acrylic resin coating composition were applied in such a manner that their liquid flow directions were opposite to each other.

(VII-1) Preparation of Acrylic Resin Coating Composition HP-1

74.2 parts by weight of ethyl methacrylate (to be abbreviated as EMA hereinafter), 33.6 parts by weight of cyclohexyl methacrylate (to be abbreviated as CHMA hereinafter), 13.0 parts by weight of 2-hydroxyethyl methacrylate (to be abbreviated as HEMA hereinafter), 12.0 parts by weight of LA-82 (hindered amine-based optical stabilizing group-containing methacrylate manufactured by ADEKA Corporation; 1,2,2,6,6-pentamethyl-4-piperidyl methacrylate), 132.8 parts by weight of methyl isobutyl ketone (to be abbreviated as MIBK hereinafter) and 66.4 parts by weight of 2-butanol (to be abbreviated as 2-BuOH hereinafter) were added to and mixed together in a flask having a reflux condenser and a stirrer whose inside had been substituted by nitrogen. A nitrogen gas was let pass through the obtained mixture for 15 minutes to remove oxygen, the temperature was raised to 70° C. in a nitrogen gas stream, and 0.33 part by weight of azobisisobutyronitrile (to be abbreviated as AIBN hereinafter) was added to carry out a reaction in a nitrogen gas stream at 70° C. for 5 hours under agitation. 0.08 part by weight of AIBN was further added, and the temperature was raised to 80° C. to carry out a reaction for 3 hours so as to obtain an acrylic copolymer solution having a nonvolatile content of 39.7 wt %. The weight average molecular weight of the acrylic copolymer was 115,000 in terms of polystyrene when measured by GPC (column; Shodex GPCA-804, eluate; THF). 68.6 parts by weight of MIBK, 34.2 parts by weight of 2-BuOH and 133 parts by weight of 1-methoxy-2-propanol (to be abbreviated as PMA hereinafter) were added to and mixed with 100 parts by weight of the acrylic copolymer solution, 4.24 parts by weight of Tinuvin 400 (triazine-based ultraviolet absorbent manufactured by Ciba Specialty Chemicals Co., Ltd.), 1.06 parts by weight of Tinuvin 479 (triazine-based ultraviolet absorbent manufactured by Ciba Specialty Chemicals Co., Ltd.) and 10.1 parts by weight of VESTANAT B1358/100 (blocked polyisocyanate compound manufactured by Degsa Japan Co., Ltd.) were added to ensure that the amount of the isocyanate group became 1.0 equivalent based on 1 equivalent of the hydroxyl group of the acrylic copolymer contained in the acrylic copolymer solution, and further 0.015 part by weight of dimethyltin dineodecanoate was added and stirred at 25° C. for 1 hour to obtain an acrylic resin coating composition (HP-1).

(VII-2) Preparation of Organosiloxane Resin Coating Composition HT-1

1.3 parts by weight of 1M hydrochloric acid was added to 133 parts by weight of a water-dispersible colloidal silica dispersion liquid (Cataloid SN-30 of Catalysts & Chemicals Industries Co., Ltd., having a solids content of 30 wt %) and stirred well. This dispersion liquid was cooled to 10° C., and 162 parts by weight of methyl trimethoxysilane was added dropwise to this dispersion liquid under cooling in an iced water bath. Right after the addition of methyl trimethoxysilane, the temperature of the mixture solution began to rise by the reaction heat and reached 60° C. in 5 minutes after the start of addition, and the temperature of the mixed solution was gradually reduced by a cooling effect. When the temperature of the mixed solution became 30° C., the mixed solution was stirred at 30° C. for 10 hours to keep this temperature, 0.8 part by weight of a methanol solution containing 45 wt % of choline as a curing catalyst, 5 parts by weight of acetic acid as a pH control agent and 440 parts by weight of isopropyl alcohol as a diluting solvent were mixed with this mixed solution to obtain an organosiloxane resin coating composition (HT-1).

(VII-3) Preparation of Acrylic Resin Coating Composition HP-2

443.4 parts by weight of MIBK, 350.3 parts by weight of 2-[4-[(2-hydroxy-3-(2'-ethyl)hexyl)oxy]-2-hydroxyphenyl]-4,6-bis(2,4-dimethylphenyl)-1,3,5-triazine (Tinubin 405 of Ciba Specialty Chemicals Co., Ltd.) and 93.1 parts by weight of 2-isocyanatoethyl methacrylate were added to and mixed together in a flask equipped with a reflux condenser and a stirrer and heated at 80° C. 0.1 part by weight of dibutyltin dilaurate was added to the resulting mixture and stirred at the same temperature for 30 minutes. After cooling to room temperature, the obtained solution was transferred into water and stirred, and the reaction product was extracted with MIBK. MIBK was distilled off, and the obtained oily matter was added dropwise to methanol and stirred to obtain a light yellow powder. The powder was dried to obtain 2-methacryloxyethylcarbamide acid 1-[3-hydroxy-4-{4,6-bis(2,4-dimethylphenyl)-1,3,5-triazin-2-yl}phenyloxy]-3-(2-ethylhexyloxy)-2-propyl (to be abbreviated as MOI-405 hereinafter). Thereafter, 62.1 parts by weight of EMA, 168.2 parts by weight of CHMA, 26.0 parts by weight of HEMA, 41.4 parts by weight of the above MOI-T405, 47.9 parts by weight of LA-82 and 518.4 parts by weight of MIBK were added to and mixed together in a flask having a reflux condenser and a stirrer whose inside had been substituted by nitrogen. A nitrogen gas was let pass through the obtained mixture for 15 minutes to remove oxygen, the temperature was raised to 70° C. in a nitrogen gas stream, and 0.66 part by weight of AIBN was added to carry out a reaction in a nitrogen gas stream at 70° C. for 5 hours under agitation. 0.16 part by weight of AIBN was further added, the temperature was raised to 80° C. to carry out a reaction for 3 hours, the reaction product was cooled to around room temperature, and 259.2 parts by weight of 2-BuOH was added to obtain an acrylic copolymer solution having a nonvolatile content of 30.4 wt %.

28.2 parts by weight of MIBK, 14.1 parts by weight of 2-BuOH and 97.8 parts by weight of PMA were added to and mixed with 100 parts by weight of the acrylic copolymer solution, 6.0 parts by weight of VESTANAT B1358/100 was added to ensure that the amount of the isocyanate group became 1.0 equivalent based on 1 equivalent of the hydroxyl group of the acrylic copolymer contained in the acrylic resin solution, and 0.53 part by weight of the above Tinuvin 479, 7.0 parts by weight of APZ-6633 (an ethanol solution of a hydrolytic condensate of a silane coupling agent manufactured by Toray Dow Corning Co., Ltd., having a solids content of 5 wt %) and 0.011 part by weight of dimethylin dineodecanoate were added and stirred at 25° C. for 1 hour to obtain an acrylic resin coating composition (HP-2).

(VII-4) Preparation of Organosiloxane Resin Coating Composition HT-2

1.3 parts by weight of 1M hydrochloric acid was added to 133 parts by weight of the above Cataloid SN-30 and stirred well. This dispersion liquid was cooled to 10° C., and 216 parts by weight of methyl trimethoxysilane was added dropwise to this dispersion liquid under cooling in an iced water bath. After the end of addition of methyl trimethoxysilane, the resulting mixture was stirred at 30° C. for 10 hours, 1.1 parts by weight of a choline methanol solution (containing 45 wt % of choline) as a curing catalyst, 6.7 parts by weight of acetic acid and 550 parts by weight of isopropyl alcohol as a diluting solvent were mixed with the mixture, and 3.4 parts by weight of 710T (IPA-dispersible titanium oxide dispersion liquid manufactured by TAYCA CORPORATION) was further added to obtain an organosiloxane resin coating composition HT-2.

(VII-5) Preparation of Acrylic Resin Coating Composition HP-3

A monomer mixed solution containing 67.5 g of 2-[2'-hydroxy-5'-(2-methacryloxyethyl)phenyl]-2H-benzotriazole (RUVA-93 of Ohtsuka Chemical Co., Ltd.), 90 g of γ-methacryloxypropyl trimethoxysilane, 270 g of methyl methacrylate, 22.5 g of glycidyl methacrylate and 350 g of diacetone alcohol and a polymerization initiator solution obtained by dissolving 2.3 g of 2,2'-azobis(2-methylbutyronitril) as an polymerization initiator in 177.7 g of diacetone alcohol were prepared in advance. 152 g of diacetone alcohol as a solvent was fed to a 2-liter flask equipped with a stirrer, a condenser and a thermometer and heated at 80° C. in a nitrogen air stream, 240 g of the above monomer mixture solution and 54 g of the above polymerization initiator solution were injected into the flask sequentially. After a reaction was carried out at 80° C. for 30 minutes, the remaining monomer mixture solution and the remaining polymerization initiator solution were added dropwise to the flask at 80 to 90° C. over 1.5 hours at the same time. After the end of addition, the resulting solution was further stirred at 80 to 90° C. for 5 hours. Thereby, an acrylic copolymer in which a trimethoxysilyl group and a benzotriazole ultraviolet absorbing group are bonded to the side chain was obtained.

100 parts by weight of the above copolymer, 33 parts by weight of organic solvent-dispersible colloidal silica (PMA-ST of Nissan Chemical Industries, Ltd.) and 3 parts by weight of the above Tinuvin 479 were diluted with a mixed solvent of diacetone alcohol and propylene glycol monomethyl ether in a weight ratio of 20:80 to ensure that the total solids content became 13.5 wt % so as to obtain an acrylic resin coating composition HP-3.

(VII-6) Preparation of Organosiloxane Resin Coating Composition HT-3

336 g of methyl triethoxysilane and 94 g of 2-BuOH were fed to a 1-liter flask equipped with a stirrer, a condenser and a thermometer and maintained at 5° C. or lower while they were stirred under cooling with ice, 283 g of water-dispersible colloidal silica (Snowtex O of Nissan Chemical Industries, Ltd.) whose temperature was reduced to 5° C. or lower was added and stirred for 3 hours under cooling with ice and then at 20 to 25° C. for 12 hours, and 27 g of diacetone alcohol and 50 g of propylene glycol monomethyl ether were added. Then, 3 g of a 10% sodium propionate aqueous solution and 0.2 g of the KP-341 polyether modified silicone (of Shin-Etsu Chemical Co., Ltd.) as a leveling agent were added, and further acetic acid was added to control pH to 6 to 7. 2-BuOH (isobutanol) was added to ensure that the nonvolatile content (JIS K 6833) became 16 wt %, and the resulting solution was aged at normal temperature for 5 days to obtain an organosiloxane resin coating composition HT-3.

(VIII) Trimming of Unrequired Portion

Figure 9:
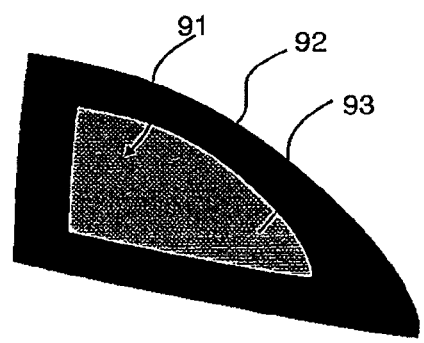
FIG. 9 is a schematic diagram of a glazing molded article obtained after a trimming step.

A molded article which was subjected to the above hard coating (VI) was cut with an NC end mill to obtain a glazing molded article whose periphery was printed black as shown in FIG. 9.

(IX) Bonding to Sus Frame and Evaluation

Examples 11 to 24

Figure 4:
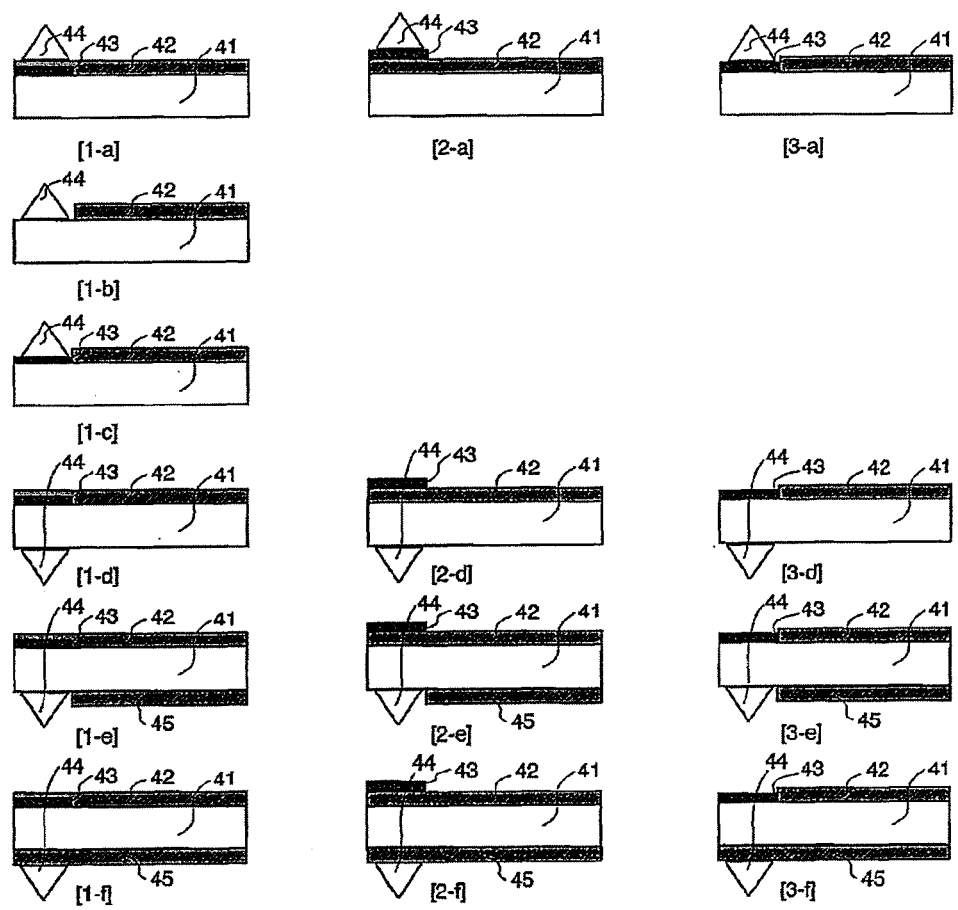
FIG. 4 is a diagram showing examples of the constitution of a print layer, a hard coat layer and an adhesive layer.

The glazing molded article after the above trimming was bonded to a 2 mm-thick SUS frame by using Hamatite WS222 which is a wet curable one-component urethane adhesive (manufactured by The Yokohama Rubber Co., Ltd.). [1-b] in the column "constitution of adhesive layer" in Table 3 indicates the constitution [1-b] in FIG. 4, and the same shall apply to other representations.

The constitution [1-b] was achieved by removing the hard coat layer of the adhesion portion by using an NC end mill after the end of the hard coating of both sides. The constitution [3-a] was achieved by carrying out the above masking treatment on the adhesion portion on the print layer, and the constitution [3-d] was achieved by carrying out the above masking treatment on the adhesion portion on the opposite side and the masking was removed prior to the application of the adhesive. The constitution [1-d] was achieved without carrying out the hard coating of the opposite side.

Prior to bonding, the adhesion portion of the glazing molded article and the adhesion portion of the SUS frame material were wiped with a BEMCOT wiper impregnated with isopropyl alcohol to make their surfaces clean. Thereafter, the RC-50E primer for bodies (manufactured by the Yokohama Rubber Co., Ltd.) was applied to the adhesion portion (slightly wider than the finally expanded area of a urethane adhesive bead) of the glazing molded article and the adhesion portion of the SUS frame. This coating was carried out by using a BEMCOT wiper which was squeezed to some extent after it was fully impregnated with a primer solution. To prevent the abrasion of the primer, after the primer was applied once, it was left in a 23° C. −50% RH atmosphere for 10 minutes and then the primer was applied again. Within 3 minutes after the second application of the primer, a urethane bead having a diameter of 5 mm was applied. This application was made round the molded article at a position about 10 mm from the outer edge of the molded article. A 3 mm-thick spacer mounted on the molded article side was used to fix the molded article to the SUS frame in such a manner that the thickness of the urethane adhesive became 3 mm. After fixing, the molded article was cured in a 23° C. −50% RH atmosphere for 1 week to promote the wet curing of the urethane adhesive. After the end of curing, the following two different acceleration treatments were made on the molded article fixed to the SUS frame.

(i) An acceleration treatment in which the molded article is kept in an oven having an inside temperature of 90° C. for 336 hours; and
(ii) an acceleration treatment in which the molded article is put in a closed container while it is covered with a cotton cloth which is squeezed after it is immersed in water and fully wet though it does not drip a water drop, and kept at 70° C. for 168 hours.

The acceleration treatment (ii) is based on a so-called "Cataplasma test".

After the above treatments, a cutter knife was inserted into the interface between the adhesive and the SUS frame to separate them from each other carefully. Three strip-like test pieces having a length of 110 mm and a width of 30 mm were cut out from a portion to which the adhesive was applied to evaluate the durability of the urethane adhesive bonded to the test pieces by a peel test. In the peel test, it is generally desired that the urethane adhesive should experience a cohesive failure and have no predetermined amount of an adhesive failure. Therefore, "CF-100" in Table 3 means that all the failures in the peel test are cohesive failures. This result is the best result. The results are shown in Table 3.

TABLE 3

| | | | | Evaluation of adhesion | |
|---|---|---|---|---|---|
| | Thermoformed sheet | Constitution of coating solution | Constitution of adhesive layer | 90° C. 336 hr | 70° C. 100% RH 168 hr |
| Ex. 11 | PTF-1 | HP-1/HT-1 | type [1-b] | CF100 | CF100 |
| Ex. 12 | PTF-1 | HP-2/HT-2 | type [1-b] | CF100 | CF100 |
| Ex. 13 | PTF-4 | HP-2/HT-2 | type [3-a] | CF100 | CF100 |
| Ex. 14 | PTF-4 | HP-3/HT-3 | type [3-e] | CF100 | CF100 |
| Ex. 15 | PTF-6 | HP-1/HT-1 | type [3-a] | CF100 | CF100 |
| Ex. 16 | PTF-6 | HP-2/HT-2 | type [3-a] | CF100 | CF100 |
| Ex. 17 | PTF-6 | HP-3/HT-3 | type [3-a] | CF100 | CF100 |
| Ex. 18 | PTF-8 | HP-1/HT-1 | type [3-e] | CF100 | CF100 |
| Ex. 19 | PTF-8 | HP-2/HT-2 | type [3-a] | CF100 | CF100 |
| Ex. 20 | PTF-8 | HP-3/HT-3 | type [3-a] | CF100 | CF100 |
| Ex. 21 | PTF-10 | HP-1/HT-1 | type [3-a] | CF100 | CF100 |
| Ex. 22 | PTF-11 | HP-1/HT-1 | type [3-a] | CF100 | CF100 |
| Ex. 23 | PTF-12 | HP-1/HT-1 | type [3-a] | CF100 | CF100 |
| Ex. 24 | PTF-12 | HP-2/HT-2 | type [1-d] | CF100 | CF100 |

Ex.: Example

As obvious from the above table, it is understood that the constitution of the adhesive layer including the print layer has excellent heat resistance and moist heat resistance and is of great practical utility.

Effect of the Invention

The process of manufacturing a curved member having a high-grade design surface of the present invention is a process capable of manufacturing a resin member having a high-grade design surface which is required for the glazing member of means of transport such as automobiles efficiently at a low cost. Therefore, it can be advantageously used in glazing materials for vehicles which require these characteristic properties, such as back door windows, sunroofs, roof panels, detachable tops, window reflectors, winker lamp lenses, room lamp lenses and front panels for displays as described above. It can also be used in a wide variety of fields such as windows for construction machines, windows for buildings, houses and conservatories, roofs for garages and arcades, lighting lenses, traffic light lenses, lenses for optical equipment, large-sized mirrors, spectacles, goggles, sound insulation walls, windshields of bikes, face plates, lighting covers, solar cell covers or solar cell substrates, covers for displays, touch panels and parts (such as circuit covers, chassis and pachinko ball conveyer guides) for play machines (such as pachinko machines), besides the glazing member for vehicles. Therefore, the present invention is useful in a wide variety of fields such as electronic and electric equipment, OA equipment, car parts, mechanical parts, agricultural materials, fishing materials, shipping containers, package containers, play tools and miscellaneous goods and provides a special industrial effect.

INDUSTRIAL APPLICABILITY

A curved member having a high-grade design surface obtained by the manufacturing process of the present invention is useful as a glazing material for vehicles.

The invention claimed is:

1. A process of manufacturing a curved member having a high-grade design surface, comprising the steps of:
    (1) preparing a sheet having a high-grade design surface and a thickness of 3-6 mm by injection compression molding a resin material containing 90-100 wt % of a polycarbonate resin (step (1));
    (2) preheating the sheet at a temperature of (Tg+15)° C. to (Tg+35)° C. (Tg(° C.) is the glass transition temperature of the resin material) to soften it (step (2)); and
    (3) applying pressure to the softened sheet to curve the high-grade design surface (step (3)).

2. The manufacturing process according to claim 1, wherein the high-grade design surface has a surface roughness (Ra) of not more than 0.06 µm and an average amplitude (y) of a surface waviness component of not more than 0.5 µm, and y satisfies the following expression (1) when the average wavelength (x) of the surface waviness component is detected on both sides, $$y \leq 0.0004x^2 + 0.0002x \quad (1)$$

wherein y is the average amplitude (Wa) (µm) of a filtered waviness curve specified in JIS B0610 of the sheet and x is the average wavelength (WSm) (mm) of the filtered waviness curve of the sheet.

3. The manufacturing process according to claim 2, wherein the curved member is translucent and satisfies the above expression (1).

4. The manufacturing process according to claim 1, wherein the sheet is manufactured by an injection compression molding method in which a molten resin material is filled into a mold cavity from a single gate or from a plurality of gates by a cascade molding system in accordance with a sequential valve gating method.

5. The manufacturing process according to claim 4, wherein the sheet is manufactured by an injection compression molding method in which the molten resin material is filled into the mold cavity from a single gate.

6. The manufacturing process according to claim 1, wherein the step (3) is the step of curving the sheet by using a mold.

7. The manufacturing process according to claim 6, wherein pressure is applied to buffer pressure from the mold surface on the high-grade design surface of the sheet.

8. The manufacturing process according to claim 1, wherein the sheet is a printed sheet at least one side of which is printed with a pattern.

9. The manufacturing process according to claim 1 comprising the step of printing a pattern on at least one side of the sheet between the step (1) and the step (2) (step (P)).

10. The manufacturing process according to claim 1 comprising the step of coating at least one side of the sheet with a hard coating solution (step (C)).

11. The manufacturing process according to claim 10 comprising the step of removing an unrequired portion of the sheet (step (T)).

12. The manufacturing process according to claim 11, wherein the step (C) and the step (T) are carried out after the step (3) in the mentioned order.

13. The manufacturing process according to claim 1 comprising the step of attaching another member to the curved member (step (A)).

14. The manufacturing process according to claim 1 comprising the step of fixing the obtained curved member to a final product (step (F)).

* * * * *